(12) United States Patent
Cho et al.

(10) Patent No.: US 11,277,186 B2
(45) Date of Patent: *Mar. 15, 2022

(54) CHANNEL STATE INFORMATION REFERENCE SIGNAL

(71) Applicants: Technology in Ariscale, LLC, Irvine, CA (US); Ariscale Inc., Daejeon (KR)

(72) Inventors: Choong Won Cho, Irvine, CA (US); Jeonghwan Park, Irvine, CA (US)

(73) Assignees: Technology In Ariscale, LLC, Irvine, CA (US); Ariscale Inc., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/888,253

(22) Filed: May 29, 2020

(65) Prior Publication Data

US 2020/0295814 A1 Sep. 17, 2020

Related U.S. Application Data

(63) Continuation of application No. 16/576,611, filed on Sep. 19, 2019, now Pat. No. 10,707,938.

(60) Provisional application No. 62/734,902, filed on Sep. 21, 2018.

(51) Int. Cl.
*H04B 7/06* (2006.01)
*H04B 7/0413* (2017.01)
*H04L 5/00* (2006.01)

(52) U.S. Cl.
CPC ......... *H04B 7/0626* (2013.01); *H04B 7/0413* (2013.01); *H04L 5/0051* (2013.01)

(58) Field of Classification Search
CPC .... H04B 7/0626; H04B 7/0413; H04L 5/0051
See application file for complete search history.

(56) References Cited

U.S. PATENT DOCUMENTS

| | | | |
|---|---|---|---|
| 10,050,754 | B2 | 8/2018 | Li et al. |
| 10,707,938 | B2 * | 7/2020 | Cho ..................... H04B 7/0417 |
| 2016/0050001 | A1 | 2/2016 | Kang et al. |
| 2016/0301511 | A1 | 10/2016 | Yoon et al. |

FOREIGN PATENT DOCUMENTS

KR 20170009860 A 1/2017

OTHER PUBLICATIONS

Ericsson, Introduction of eFD-MIMO, R1-1704157, 3GPP TSG-RAN1 Meeting #88, Athens, Greece, Mar. 4, 2017 See p. 30; and table 6.10.5-1.
Search Report and Written Opinion dated Jan. 3, 2020 for PCT Application No. PCT/US2019/052001.

* cited by examiner

*Primary Examiner* — Siming Liu

(57) ABSTRACT

In a Multiple-Input Multiple-Output (MIMO) system including a large number of antenna ports, a base station such as a Node B communicates a total number of antenna ports by communicating the number of antenna ports per Channel State Information Reference Signal (CSI-RS) configuration and one or more CSI-RS configurations. A User Equipment determines the number of antenna ports from the information communicated by the base station by determining the number of CSI-RS configurations sent by the base station and multiplying that number by the number of antenna ports per CSI-RS configuration indicated by the base station.

16 Claims, 13 Drawing Sheets

| CSI-RS-1/2 PORTS, EXTENDED CP |||||||||||||
|---|---|---|---|---|---|---|---|---|---|---|---|
| 0 | 1 | 2 | 3 | 4 | 5 | 0 | 1 | 2 | 3 | 4 | 5 | |
| | | | | 0,A | 0,A | | | 16,A | 16,A | | | 11 |
| | | | | | | | | 17,A | 17,A | 2,A | 2,A | 10 |
| | | | | 1,A | 1,A | | | 18,A | 18,A | 3,A | 3,A | 9 |
| | | | | 8,A | 8,A | | | 22,A | 22,A | | | 8 |
| | | | | | | | | 23,A | 23,A | 12,A | 12,A | 7 |
| | | | | 9,A | 9,A | | | 24,A | 24,A | 13,A | 13,A | 6 |
| | | | | 4,A | 4,A | | | 19,A | 19,A | | | 5 |
| | | | | | | | | 20,A | 20,A | 6,A | 6,A | 4 |
| | | | | 5,A | 5,A | | | 21,A | 21,A | 7,A | 7,A | 3 |
| | | | | 10,A | 10,A | | | 25,A | 25,A | | | 2 |
| | | | | | | | | 26,A | 26,A | 14,A | 14,A | 1 |
| | | | | 11,A | 11,A | | | 27,A | 27,A | 15,A | 15,A | 0 |

| CSI-RS-4 PORTS, EXTENDED CP |||||||||||||
|---|---|---|---|---|---|---|---|---|---|---|---|
| 0 | 1 | 2 | 3 | 4 | 5 | 0 | 1 | 2 | 3 | 4 | 5 | |
| | | | | 0,A | 0,A | | | 16,A | 16,A | | | 11 |
| | | | | | | | | 17,A | 17,A | 2,A | 2,A | 10 |
| | | | | 1,A | 1,A | | | 18,A | 18,A | 3,A | 3,A | 9 |
| | | | | 0,B | 0,B | | | 16,B | 16,B | | | 8 |
| | | | | | | | | 17,B | 17,B | 2,B | 2,B | 7 |
| | | | | 1,B | 1,B | | | 18,B | 18,B | 3,B | 3,B | 6 |
| | | | | 4,A | 4,A | | | 19,A | 19,A | | | 5 |
| | | | | | | | | 20,A | 20,A | 6,A | 6,A | 4 |
| | | | | 5,A | 5,A | | | 21,A | 21,A | 7,A | 7,A | 3 |
| | | | | 4,B | 4,B | | | 19,B | 19,B | | | 2 |
| | | | | | | | | 20,B | 20,B | 6,B | 6,B | 1 |
| | | | | 5,B | 5,B | | | 21,B | 21,B | 7,B | 7,B | 0 |

| CSI-RS-8 PORTS, EXTENDED CP |||||||||||||
|---|---|---|---|---|---|---|---|---|---|---|---|
| 0 | 1 | 2 | 3 | 4 | 5 | 0 | 1 | 2 | 3 | 4 | 5 | |
| | | | | 0,A | 0,A | | | 16,A | 16,A | | | 11 |
| | | | | | | | | 17,A | 17,A | 2,A | 2,A | 10 |
| | | | | 1,A | 1,A | | | 18,A | 18,A | 3,A | 3,A | 9 |
| | | | | 0,B | 0,B | | | 16,B | 16,B | | | 8 |
| | | | | | | | | 17,B | 17,B | 2,B | 2,B | 7 |
| | | | | 1,B | 1,B | | | 18,B | 18,B | 3,B | 3,B | 6 |
| | | | | 0,C | 0,C | | | 16,C | 16,C | | | 5 |
| | | | | | | | | 17,C | 17,C | 2,C | 2,C | 4 |
| | | | | 1,C | 1,C | | | 18,C | 18,C | 3,C | 3,C | 3 |
| | | | | 0,D | 0,D | | | 16,D | 16,D | | | 2 |
| | | | | | | | | 17,D | 17,D | 2,D | 2,D | 1 |
| | | | | 1,D | 1,D | | | 18,D | 18,D | 3,D | 3,D | 0 |

CONTROL REGION  
CRS  
DM-RS

Table 1: Normal CP

| | CSI reference signal configuration | Number of CSI reference signals configure | | | | | |
|---|---|---|---|---|---|---|---|
| | | 1 or 2 | | 4 | | 8 | |
| | | $(k',l')$ | $n_s \bmod 2$ | $(k',l')$ | $n_s \bmod 2$ | $(k',l')$ | $n_s \bmod 2$ |
| Frame Structure Type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 only | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

FIG. 8B

Table 2: Extended CP

| | CSI reference signal configuration | Number of CSI reference signals configure | | | | | |
|---|---|---|---|---|---|---|---|
| | | 1 or 2 | | 4 | | 8 | |
| | | $(k',l')$ | $n_s$ mod 2 | $(k',l')$ | $n_s$ mod 2 | $(k',l')$ | $n_s$ mod 2 |
| Frame Structure Type 1 and 2 | 0 | (11,4) | 0 | (11,4) | 0 | (11,4) | 0 |
| | 1 | (9,4) | 0 | (9,4) | 0 | (9,4) | 0 |
| | 2 | (11,4) | 1 | (11,4) | 1 | (11,4) | 1 |
| | 3 | (9,4) | 1 | (9,4) | 1 | (9,4) | 1 |
| | 4 | (5,4) | 0 | (5,4) | 0 | | |
| | 5 | (3,4) | 0 | (3,4) | 0 | | |
| | 6 | (4,4) | 1 | (4,4) | 1 | | |
| | 7 | (3,4) | 1 | (3,4) | 1 | | |
| | 8 | (8,4) | 0 | | | | |
| | 9 | (6,4) | 0 | | | | |
| | 10 | (2,4) | 0 | | | | |
| | 11 | (0,4) | 0 | | | | |
| | 12 | (7,4) | 1 | | | | |
| | 13 | (6,4) | 1 | | | | |
| | 14 | (1,4) | 1 | | | | |
| | 15 | (0,4) | 1 | | | | |
| Frame structure type 2 only | 16 | (11,1) | 1 | (11,1) | 1 | (11,1) | 1 |
| | 17 | (10,1) | 1 | (10,1) | 1 | (10,1) | 1 |
| | 18 | (9,1) | 1 | (9,1) | 1 | (9,1) | 1 |
| | 19 | (5,1) | 1 | (5,1) | 1 | | |
| | 20 | (4,1) | 1 | (4,1) | 1 | | |
| | 21 | (3,1) | 1 | (3,1) | 1 | | |
| | 22 | (8,1) | 1 | | | | |
| | 23 | (7,1) | 1 | | | | |
| | 24 | (6,1) | 1 | | | | |
| | 25 | (2,1) | 1 | | | | |
| | 26 | (1,1) | 1 | | | | |
| | 27 | (0,1) | 1 | | | | |

FIG. 9

Table 3

| Total No. of antenna ports $N_{res}^{CSI} N_{ports}^{CSI}$ | Antenna ports per CSI-RS config. $N_{ports}^{CSI}$ | Number of CSI-RS configs. $N_{res}^{CSI}$ |
|---|---|---|
| 12 | 4 | 3 |
| 16 | 8 | 2 |
| 20 | 4 | 5 |
| 24 | 8 | 3 |
| 28 | 4 | 7 |
| 32 | 8 | 4 |
| 40 | 8 | 5 |
| 48 | 8 | 6 |
| 56 | 8 | 7 |

FIG. 10

```
-- ASN1START
CSI-RS-ConfigNZP-r11 ::=      SEQUENCE {
    csi-RS-ConfigNZPId-r11        CSI-RS-ConfigNZPId-r11,
    antennaPortsCount-r11         ENUMERATED {an1, an2, an4, an8},
    resourceConfig-r11            INTEGER (0..31),
    subframeConfig-r11            INTEGER (0..154),
    scramblingIdentity-r11        INTEGER (0..503),
    qcl-CRS-Info-r11              SEQUENCE {
        qcl-ScramblingIdentity-r11    INTEGER (0..503),
        crs-PortsCount-r11            ENUMERATED {n1, n2, n4, spare1},
        mbsfn-SubframeConfigList-r11  CHOICE {
            release                       NULL,
            setup                         SEQUENCE {
                subframeConfigList            MBSFN-SubframeConfigList
            }
        }                                                                     OPTIONAL   -- Need ON
    }                                                                         OPTIONAL,  -- Need OR
    ...,
    [[ csi-RS-ConfigNZPId-v1310       CSI-RS-ConfigNZPId-v1310      OPTIONAL   -- Need ON
    ]],
    [[ transmissionComb-r14           NZP-TransmissionComb-r14      OPTIONAL,  -- Need OR
       frequencyDensity-r14           NZP-FrequencyDensity-r14      OPTIONAL   -- Need OR
    ]],
    [[ mbsfn-SubframeConfigList-v1430 CHOICE {
            release                       NULL,
            setup                         SEQUENCE {
                subframeConfigList-v1430      MBSFN-SubframeConfigList-v1430
            }
       }                                                                      OPTIONAL   -- Need OP
    ]]
}
CSI-RS-ConfigNZP-EMIMO-r13 ::= CHOICE {
    release                       NULL,
    setup                         SEQUENCE {
        nzp-resourceConfigList-r13    SEQUENCE (SIZE (1..2)) OF NZP-ResourceConfig-r13,
        cdmType-r13                   ENUMERATED {cdm2, cdm4} OPTIONAL    -- Need OR
    }
}
CSI-RS-ConfigNZP-EMIMO-v1430 ::=  SEQUENCE {
    -- All extensions are for Non-Precoded so could be grouped by setup/ release choice
    nzp-resourceConfigListExt-r14  SEQUENCE (SIZE (0..4)) OF NZP-ResourceConfig-r13,
    cdmType-v1430                  ENUMERATED {cdm8 }            OPTIONAL    -- Need OR
}

NZP-ResourceConfig-r13 ::=  SEQUENCE {
    resourceConfig-r13            ResourceConfig-r13,
    ...,
    [[ transmissionComb-r14           NZP-TransmissionComb-r14      OPTIONAL,  -- Need OR
       frequencyDensity-r14           NZP-FrequencyDensity-r14      OPTIONAL   -- Need OR
    ]]
}
ResourceConfig-r13 ::=        INTEGER (0..31)
NZP-TransmissionComb-r14 ::=      INTEGER (0..2)
NZP-FrequencyDensity-r14 ::=      ENUMERATED {d1, d2, d3}
-- ASN1STOP
```

FIG. 11

Table 4: *CSI-RS-ConfigNZP* field descriptions

| |
|---|
| antennaPortsCount |
| Parameter represents the number of antenna ports used for transmission of CSI reference signals where an1 corresponds to 1, an2 to 2 antenna ports etc. see TS 36.211 [21, 6.10.5]. |
| cdmType |
| Parameter: *CDMType*, see TS 36.211 [21, 6.10.5.2]. |
| csi-RS-ConfigNZPId |
| Refers to a CSI RS configuration using non-zero power transmission that is configured for the same frequency as the CSI process. UE shall ignore *CSI-RS-ConfigNZPId-r11* if *CSI-RS-ConfigNZPId-v1310* is signalled. |
| frequencyDensity |
| Indicates the freqency-domain density reduction. E-UTRAN configures the values in accordance with the restrictions specified in TS 36.213 [23]. |
| mbsfn-SubframeConfigList |
| Indicates the MBSFN configuration for the CSI-RS resources. If *qcl-CRS-Info-r11* is absent, the field is released. |
| nzp-resourceConfigList |
| Indicate a list of non-zero power transmission CSI-RS resources using parameter *resourceConfig*. |
| qcl-CRS-Info |
| Indicates CRS antenna ports that is quasi co-located with the CSI-RS antenna ports, see TS 36.213 [23, 7.2.5]. EUTRAN configures this field if and only if the UE is configured with *qcl-Operation* set to *typeB*. |
| resourceConfig |
| Parameter: CSI reference signal configuration, see TS 36.211 [21, table 6.10.5.2-1 and 6.10.5.2-2]. |
| subframeConfig |
| Parameter: $I_{CSI-RS}$, see TS 36.211 [21, table 6.10.5.3-1]. |
| scramblingIdentity |
| Parameter: Pseudo-random sequence generator parameter, $n_{ID}$, see TS 36.213 [23, 7.2.5]. |
| transmissionComb |
| Indicates the transmission combining offset. E-UTRAN configures the values in accordance with the restrictions specified in TS 36.213 [23]. |

FIG. 12

Table 5

| Total number of antenna ports $N_{res}^{CSI} N_{ports}^{CSI}$ | Number of antenna ports per CSI-RS configuration $N_{ports}^{CSI}$ | Number of CSI-RS configurations $N_{res}^{CSI}$ |
|---|---|---|
| 12 | 4 | 3 |
| 16 | 8 | 2 |
| 20 | 4 | 5 |
| 24 | 8 | 3 |
| 28 | 4 | 7 |
| 32 | 8 | 4 |
| 36 | 4 | 9 |
| 40 | 8 | 5 |
| 44 | 4 | 11 |
| 48 | 8 | 6 |
| 52 | 4 | 13 |
| 56 | 8 | 7 |

FIG. 13A
CSI-RS-ConfigNZP information elements

```
-- ASN1START

CSI-RS-ConfigNZP-r11 ::=     SEQUENCE {
    csi-RS-ConfigNZPId-r11       CSI-RS-ConfigNZPId-r11,
    antennaPortsCount-r11        ENUMERATED {an1, an2, an4, an8},
    resourceConfig-r11           INTEGER (0..31),
    subframeConfig-r11           INTEGER (0..154),
    scramblingIdentity-r11       INTEGER (0..503),
    qcl-CRS-Info-r11             SEQUENCE {
        qcl-ScramblingIdentity-r11     INTEGER (0..503),
        crs-PortsCount-r11             ENUMERATED {n1, n2, n4, spare1},
        mbsfn-SubframeConfigList-r11   CHOICE {
                release                        NULL,
                setup                          SEQUENCE {
                    subframeConfigList         MBSFN-SubframeConfigList
                }
        }                                                       OPTIONAL   -- Need ON
    }                                                           OPTIONAL,  -- Need OR
    ...,
    [[ csi-RS-ConfigNZPId-v1310      CSI-RS-ConfigNZPId-v1310   OPTIONAL   -- Need ON
    ]],
    [[ transmissionComb-r14          NZP-TransmissionComb-r14   OPTIONAL,  -- Need OR
       frequencyDensity-r14          NZP-FrequencyDensity-r14   OPTIONAL   -- Need OR
    ]],
    [[ mbsfn-SubframeConfigList-v1430  CHOICE {
                release                        NULL,
                setup                          SEQUENCE {
                    subframeConfigList-v1430   MBSFN-SubframeConfigList-v1430
                }
        }                                                       OPTIONAL   -- Need OP
    ]]
}

CSI-RS-ConfigNZP-EMIMO-r13 ::=   CHOICE {
    release                    NULL,
    setup                      SEQUENCE {
        nzp-resourceConfigList-r13     SEQUENCE (SIZE (1..2)) OF NZP-ResourceConfig-r13,
        cdmType-r13                    ENUMERATED {cdm2, cdm4}   OPTIONAL   -- Need OR
    }
}
CSI-RS-ConfigNZP-EMIMO-v1430 ::=  SEQUENCE {
    -- All extensions are for Non-Precoded so could be grouped by setup/ release choice
    nzp-resourceConfigListExt-r14 SEQUENCE (SIZE (0..4)) OF NZP-ResourceConfig-r13,
    cdmType-v1430                ENUMERATED {cdm8 }          OPTIONAL   -- Need OR
}

CSI-RS-ConfigNZP-EMIMO-r15 ::=   SEQUENCE {
    -- All extensions are for Non-Precoded so could be grouped by setup/ release choice
    nzp-resourceConfigListExt-r15 SEQUENCE (SIZE (0..5)) OF NZP-ResourceConfig-r13,
    cdmType-r15                  ENUMERATED {cdm8 }          OPTIONAL   -- Need OR
}
```

FIG. 13B
*CSI-RS-ConfigNZP* information elements (cont.)

```
...

CSI-RS-ConfigNZP-EMIMO-rX ::= SEQUENCE {
    -- All extensions are for Non-Precoded so could be grouped by setup/ release choice
    nzp-resourceConfigListExt-rX  SEQUENCE (SIZE (0..5)) OF NZP-ResourceConfig-r13,
    cdmType-rX                    ENUMERATED {cdm8 }       OPTIONAL    -- Need OR
}

NZP-ResourceConfig-r13 ::=   SEQUENCE {
    resourceConfig-r13            ResourceConfig-r13,
    ...,
    [[ transmissionComb-r14       NZP-TransmissionComb-r14   OPTIONAL,  -- Need OR
       frequencyDensity-r14       NZP-FrequencyDensity-r14   OPTIONAL   -- Need OR
    ]]
}

ResourceConfig-r13 ::=           INTEGER (0..31)

NZP-TransmissionComb-r14 ::=     INTEGER (0..2)
NZP-FrequencyDensity-r14 ::=     ENUMERATED {d1, d2, d3}

-- ASN1STOP
```

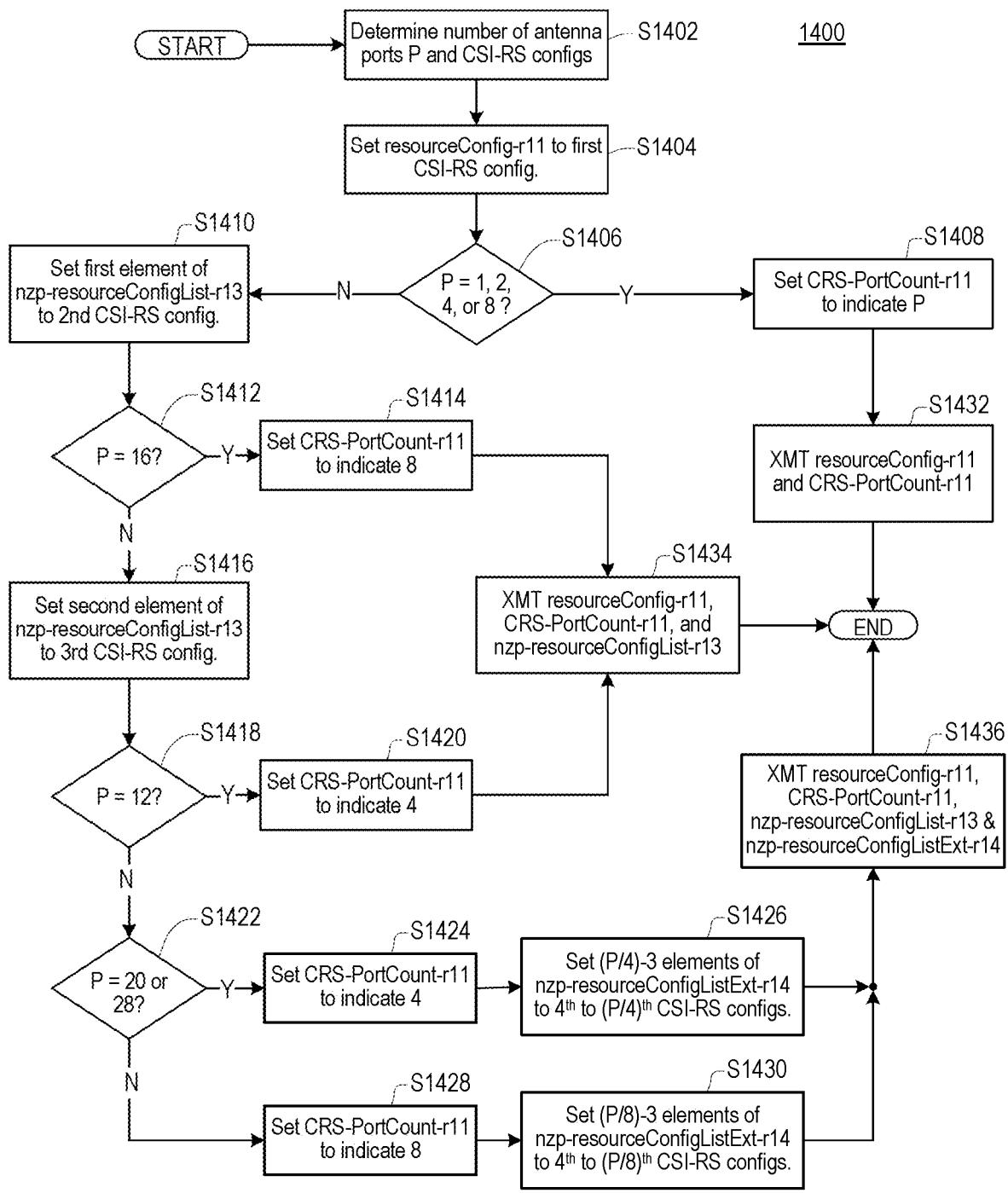

CHANNEL STATE INFORMATION REFERENCE SIGNAL

CROSS-REFERENCE TO RELATED APPLICATIONS

This application is a continuation of U.S. patent application Ser. No. 16/576,611, filed on Sep. 19, 2019, which claims the benefit of U.S. Provisional Application No. 62/734,902, filed on Sep. 21, 2018, which is incorporated herein by reference in its entirety.

BACKGROUND

1. Technical Field

The present disclosure relates to a wireless communication system, and more particularly, to a method, an apparatus, software, or a recording medium that stores software, for transmitting or receiving information regarding antenna configurations of devices in a wireless communication system.

2. Background Art

Multi-Input Multi-Output (MIMO) technology operates to improve the efficiency of transmission and reception of data using multiple transmission antennas and multiple reception antennas, as opposed to using a single transmission antenna and a single reception antenna. A receiving end may receive data through a single antenna path when a single antenna is used. When multiple antennas are used, the receiving end may receive data through multiple paths. Therefore, the data transmission speed and the amount of data transmitted may be improved by taking advantage of multiplex gain, and coverage may be extended.

Antennas may be used through the logical concept of an antenna port. Antenna ports may not directly correspond to physical antennas, but rather are distinguished by their reference signal sequences. Multiple antenna port signals can be transmitted on a single transmit antenna, and a single antenna port can be spread across multiple transmit antennas. In a MIMO configuration, each antenna port may be associated with a single respective physical antenna to create spatial diversity, but embodiments are not limited thereto.

To increase the multiplex gain of a MIMO operation, a MIMO transmitting end may use Channel State Information (CSI) that is fed back from a MIMO receiving end. This may be referred to as a closed-loop (CL)-MIMO operation. The receiving end may determine the CSI by measuring a channel based on a predetermined reference signal (RS) obtained from the transmitting end. The CSI may include a rank indicator (RI), a precoding matrix index (PMI), channel quality information (CQI), and the like.

In the case where data is transmitted or received using multiple antennas, a channel state between each transmission antenna and each reception antenna should be determined to properly receive a signal. Therefore, a reference signal for each antenna port is needed. In the 3GPP system including LTE, LTE-Advance, LTE-Advanced Pro, and 5G system(s), various reference signals are defined. For example, in the system according to LTE release-8 and 9, Cell-Specific RS (CRS) that is transmitted for each subframe in a broadband, a UE-specific RS that is used for demodulating data, and the like, are defined. Also, in the system after LTE release 10, a CSI-RS for measuring a channel, a DeModulation-RS (DM-RS) for demodulating data or Enhanced Physical Downlink Control Channel (EPDCCH), and the like, are additionally defined as new reference signals for supporting a maximum of 8 antenna ports in a downlink.

The release 11 of the LTE standard uses 1, 2, 4, or 8 antenna ports, and the Node-B (or eNodeB) signals the number of antenna ports to be used for transmission of CSI reference signals by using the parameter antennaPortsCount-r11 of a Radio Resource Control (RRC) connection Reconfiguration message. However, the antennaPortsCount-r11 parameter is not able to indicate more antenna ports than 8.

However, as the following release of the LTE standard supports more antenna ports like 16, 24 and 32, the Node-B is not able to signal the total number of antenna ports by way of the existing parameter antennaPortsCount-r11. Release 13 of the LTE standard defines not only 1, 2, 4 or 8 but also 12 or 16 as the supported total number of antenna ports. 12 antenna ports are grouped into 3 antenna port groups, each of which has 4 antenna ports. 16 antenna ports are grouped to 2 antenna port groups, each of which has 8 antenna ports. As one CSI-RS configuration is allocated to one antenna port group, the number of antenna port groups is equal to the number of CSI-RS configurations. The Node-B of release 13 does not explicitly signal the total number of antenna ports.

The release 14 of the LTE standard increased the total number of antenna ports. Up to 32 antenna ports can be used according to the release 14. However, the release 14 have not defined how to signal the total number of antenna ports.

SUMMARY OF INVENTION

Illustrative embodiments disclose a method, an apparatus, software, or a recording medium that stores software, for communicating a number of antenna ports in a wireless communication system that supports Multi-Input Multi-Output (MIMO) technology, and in particular when the number of antenna ports is larger than 16. Embodiment allow the number of number of antenna ports to be communicated while maintaining backward compatibility with devices that do not support more than 16 antenna ports.

Embodiments include a method performed by a wireless device, the method comprising generating an antenna ports count parameter indicative of a number of antenna ports, and generating a sequence of Channel State Information Reference Signal (CSI-RS) configuration indications. The CSI-RS configuration indications are included in a first resource configuration parameter including a first CSI-RS configuration indication, a first resource configuration list and a second resource configuration list. Each resource configuration list including part of remaining CSI-RS configuration indications, and a total number of antenna ports is equal to a product of a number of CSI-RS configuration indications and the number of antenna ports. The method further comprises transmitting the antenna ports count parameter, the first resource configuration parameter, the first resource configuration list and the second resource configuration list.

In an embodiment, when N>1 CSI-RS configurations exist and are numbered from 0 to N−1, value 0 corresponds to the first CSI-RS configuration indication included in the first resource configuration parameter and value k (k>0) corresponds to a k-th entry of CSI-RS configuration indications from an aggregated list consisting of the first resource configuration list and the second resource configuration list.

In an embodiment, the number of the CSI-RS configuration indications is equal to a sum of one, a first number of CSI-RS configuration indications included in the first resource configuration list, and a second number of CSI-RS configuration indications included in the second resource configuration list.

In an embodiment, the first resource configuration list is followed by the second resource configuration list in the aggregated list.

In an embodiment, the number of CSI-RS configuration indications is equal to a sum of one and a number of CSI-RS configuration indications included in the aggregated list consisting of the first resource configuration list and the second resource configuration list.

In an embodiment, CSI-RS configuration indications are included in the first resource configuration parameter including the first CSI-RS configuration indication and two or more configuration lists including remaining CSI-RS configuration indications, and the aggregated list consists of the two or more resource configuration lists.

In an embodiment, the number of CSI-RS configuration indications is equal to a sum of one and respective numbers of CSI-RS configuration indications included in the two or more resource configuration lists.

In an embodiment, the number of CSI-RS configuration indications is equal to a sum of one and a number of CSI-RS configuration indications included in the aggregated list consisting of the two or more resource configuration lists.

In an embodiment, the total number of antenna ports are greater than a maximum number of antenna ports indicated by the antenna ports count parameter.

Embodiments include a method performed by a wireless device, the method comprising receiving an antenna ports count parameter indicative of a number of antenna ports, and receiving a sequence of Channel State Information Reference Signal (CSI-RS) configuration indications. The CSI-RS configuration indications are included in a first resource configuration parameter including a first CSI-RS configuration indication, a first resource configuration list, and a second resource configuration list, each resource configuration list including part of remaining CSI-RS configuration indications. The method further comprises determining a total number of antenna ports, the total number of antenna ports being equal to a product of a number of CSI-RS configuration indications and the number of antenna ports.

In an embodiment, when N>1 CSI-RS configurations exist and are numbered from 0 to N−1, value 0 corresponds to the first CSI-RS configuration indication included in the first resource configuration parameter and value k (k>0) corresponds to a k-th entry of CSI-RS configuration indications from an aggregated list consisting of the first resource configuration list and the second resource configuration list.

In an embodiment, the number of the CSI-RS configuration indications is equal to a sum of one, a first number of CSI-RS configuration indications included in the first resource configuration list and a second number of CSI-RS configuration indications included in the second resource configuration list.

In an embodiment, the first resource configuration list is followed by the second resource configuration list in the aggregated list.

In an embodiment, the number of CSI-RS configuration indications is equal to a sum of one and a number of CSI-RS configuration indications included in the aggregated list consisting of the first resource configuration list and the second resource configuration list.

In an embodiment, CSI-RS configuration indications are included in the first resource configuration parameter including the first CSI-RS configuration indication and two or more configuration lists including remaining CSI-RS configuration indications, and the aggregated list consists of the two or more resource configuration lists.

In an embodiment, the number of CSI-RS configuration indications is equal to a sum of one and respective numbers of CSI-RS configuration indications included in the two or more resource configuration lists.

In an embodiment, the number of CSI-RS configuration indications is equal to a sum of one and a number of CSI-RS configuration indications included in the aggregated list consisting of the two or more resource configuration lists.

In an embodiment, the total number of antenna ports are greater than a maximum number of antenna ports indicated by the antenna ports count parameter.

BRIEF DESCRIPTION OF DRAWINGS

FIGS. 7A and 7B illustrate resource mapping of Channel State Information Reference Signals (CSI-RSs) in resource blocks of a downlink subframe.

FIG. 8A includes a table showing parameters for configuring a CSI-RS pattern when a normal Cyclic Prefix (CP) is used.

FIG. 8B includes a table s showing parameters for configuring a CSI-RS pattern when an extended CP is used.

FIG. 9 is a table showing supported configurations for $N_{ports}^{CSI}$ and $N_{res}^{CSI}$, and a corresponding total number of antenna ports P according to an embodiment.

FIG. 10 shows CSI-RS-ConfigNZP (CSI-RS-ConfigNZP-r11) information elements according to the embodiment of FIG. 9.

FIG. 11 shows a table describing fields in the CSI-RS-ConfigNZP information of FIG. 10.

FIG. 12 is a table showing supported configurations for $N_{ports}^{CSI}$ and $N_{res}^{CSI}$, and a corresponding total number of antenna ports P according to another embodiment.

FIGS. 13A and 13B show CSI-RS-ConfigNZP information elements according to the embodiment of FIG. 12.

FIG. 14 illustrates a process for communicating a total number of antenna ports according to an embodiment.

DESCRIPTION OF EMBODIMENTS

Figure 1:
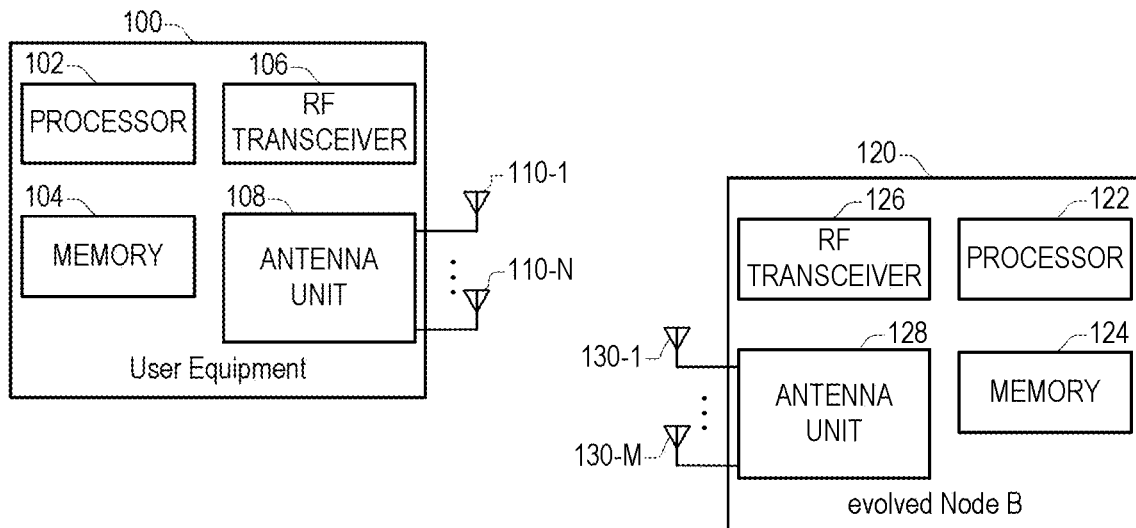
FIG. 1 illustrates wireless devices according to an embodiment of the present invention.

Illustrative embodiments of the present invention will be described more fully hereinafter with reference to the accompanying drawings, in which illustrative embodiments of the invention are shown. Throughout the drawings and the detailed description, unless otherwise described, the same drawing reference numerals are understood to refer to the same elements, features, and structures. In describing the illustrative embodiments, detailed description on known configurations or functions may be omitted for clarity and conciseness.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

That is, it is apparent that various operations, which are performed for the communication with a terminal in a network formed of a plurality of network nodes including a Base Station (BS), are executable by the BS or other network nodes excluding the BS. The 'BS' may be replaced with the terms, such as a fixed station, a Node B, an evolved Node B (eNB), an Access Point (AP), and the like. Also, the 'terminal' may be replaced with the terms, such as a User Equipment (UE), a Mobile Station (MS), a Mobile Subscriber Station (MSS), a Subscriber Station (SS), a non-AP station (non-AP STA), and the like.

The terms used for describing the embodiments of the present invention are described through the 3GPP LTE/LTE-Advanced (LTE-A) standard documents, unless otherwise noted. However, this is merely for the economic feasibility and clarity of description. It should be construed that the application of the embodiments of the present invention is not limited to the system based on the 3GPP LTE/LTE-A or following standards.

FIG. 1 illustrates wireless devices according to an embodiment of the present invention, and in particular a User Equipment (UE) 100 and an evolved Node B (eNB) 120. The UE 100 may correspond to a downlink receiving device and/or an uplink transmitting device, and the eNB 200 may corresponds to a downlink transmitting device and/or an uplink receiving device.

The UE 100 may include a processor 102, a memory 104, a transceiver 106, and an antenna unit 108. The antenna unit 108 may be coupled to one or more antennas 110-1 to 110-N. One or more antenna ports may be respectively associated with the one or more of the one or more antennas 110-1 to 110-N.

The processor 102 processes signals related to a baseband, and may include a higher layer processing unit and a physical layer processing unit. The higher layer processing unit may process operations related to a Medium Access Control (MAC) layer, a Radio Resource Control (RRC) layer, or a higher layer than those. The physical layer processing unit may process operations of a physical (PHY) layer (e.g., processing an uplink transmission signal or processing a downlink reception signal). The processor 102 may control the general operations of the UE 100, in addition to processing signals related to a baseband. Operations performed by the processor 102 may be performed by executing computer programming instructions stored in the memory 104.

The memory 104 may include volatile memory such as Dynamic Random Access Memory (DRAM) and non-volatile memory such as Flash memory or Read-Only Memory (ROM). The memory 104 may store information processed by the processor 102, and software, an operating system (OS), applications or the like associated with the operations of the UE 100, and may include components, such as a buffer or the like.

The transceiver 106 is coupled to the antenna unit 108 and may include a Radio Frequency (RF) transmitter and an RF receiver. The antenna unit 108 may be electrically coupled to N physical antennas 110-1 to 110-N, where N is greater than or equal to 1. The UE 100 may support Multi-Input Multiple-Output (MIMO) transmission and/or reception when a plurality of antennas are coupled to the antenna unit 108.

The eNB 120 may include a processor 122, a memory 124, a transceiver 126, and an antenna unit 128. The antenna unit 128 may be coupled to one or more antennas 130-1 to 130-M. The processor 122, a memory 124, a transceiver 126, and an antenna unit 128 of the eNB 120 are respectively similar to the processor 102, memory 104, transceiver 106, and antenna unit 108 of the UE 100, and accordingly descriptions thereof are omitted in the interest of brevity.

The antenna unit 128 may be electrically coupled to M physical antennas 130-1 to 130-M, where M is greater than or equal to 1 and is not necessarily equal to the number of antennas N of the UE 100. The eNB 120 may support MIMO transmission and/or MIMO reception when a plurality of antennas are coupled to the antenna unit 128. One or more antenna ports may be respectively associated with the one or more of the one or more antennas 130-1 to 130-M.

Figure 2:
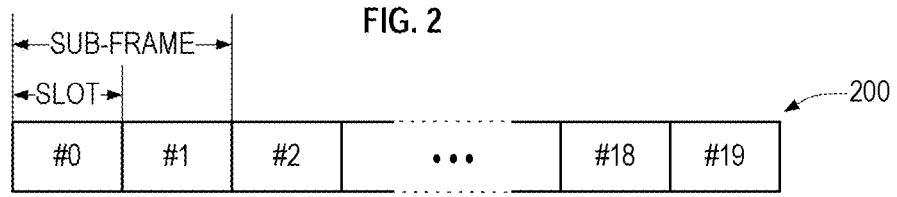
FIG. 2 illustrates a type of radio frame of a 3GPP LTE system.
Figure 3:
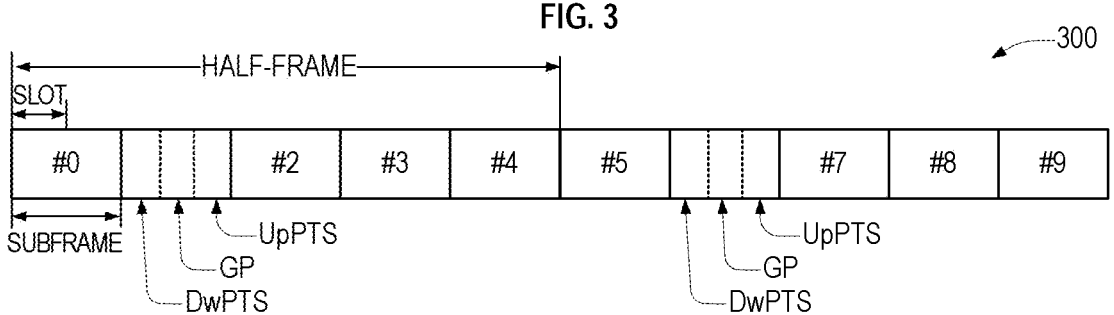
FIG. 3 illustrates another type of radio frame of a 3GPP LTE system.

FIGS. 2 and 3 respectively illustrate Type 1 and Type 2 structures of a radio frame of the 3GPP LTE system. In a cellular Orthogonal Frequency Division Multiplexing (OFDM) wireless packet communication system, an uplink transmission or a downlink transmission is executed based on a subframe unit. A single subframe is defined as a predetermined period of time including a plurality of OFDM symbols. The type 1 radio frame is applied to 3GPP LTE Frequency Division Duplex (FDD) communications, and the type 2 radio frame is applied to 3GPP LTE Time Division Duplex (TDD) communications.

FIG. 2 illustrates the radio frame structure type 1. A single radio frame is formed of 10 subframes, and a single subframe is formed of 2 slots in the time domain. A time expended for transmitting a single subframe is a Transmission Time Interval (TTI). For example, the length of a single subframe is 1 millisecond (ms), and the length of a single slot is 0.5 ms. A single slot may include a plurality of symbols in the time domain. The symbol may be an Orthogonal Frequency Division Multiplexing (OFDM) symbol in the downlink transmission, or may be a Single Carrier-Frequency Division Multiple Access (SC-FDMA) symbol in the uplink transmission, but embodiments are not be limited thereto.

FIG. 3 illustrates the radio frame structure type 2. The radio frame structure type 2 is formed of 2 half frames, and each half frame may be formed of 5 subframes, a Downlink Pilot Time Slot (DwPTS), a Guard Period (GP), and an Uplink Pilot Time Slot (UpPTS). Like the radio frame structure type 1, a single subframe is formed of 2 slots. The DwPTS is used for initial cell search, synchronization, or channel estimation in a UE, in addition to transmission and reception of data. The UpPTS is used for channel estimation and uplink transmission synchronization with a terminal, in an eNB. The GP is a period between an uplink communication and a downlink communication, for removing interference generated in the uplink due to a multi-path delay of a downlink signal. The DwPTS, GP, and UpPTS may be also referred to as special subframes.

Figure 4:
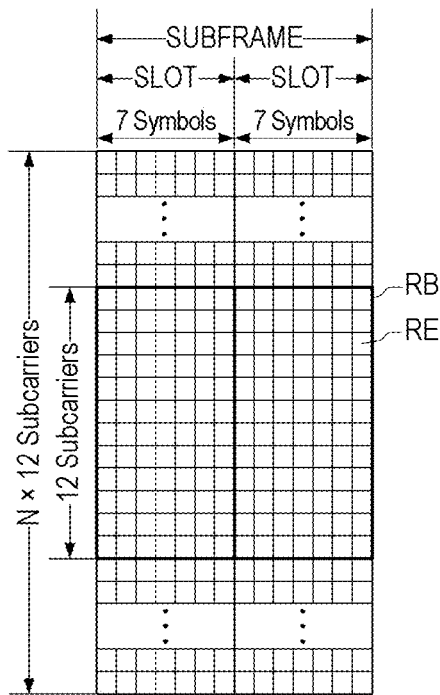
FIG. 4 illustrates the structure of a subframe of a 3GPP LTE radio frame.

FIG. 4 illustrates the structure of a subframe of a 3GPP radio frame, such as the type 1 and type radio frame respectively illustrated in FIGS. 2 and 3. The subframe includes a first slot and a second slot.

The number of symbols included in a slot may differ according to a Cyclic Prefix (CP) setting. The CP setting may indicate an extended CP and a normal CP. In the case of the normal CP, the number of symbols included in a single slot may be 7, as shown in FIG. 4. In the case of the extended CP, the length of one symbol is extended and thus, the number of symbols included in a single slot may be 6. When the size of a cell is large, or when a channel state is unstable such as when a UE moves fast, or the like, an extended CP may be used to reduce inter-symbol interference.

In the resource grid of FIG. 4, a single slot corresponds to 7 symbols in the time domain, corresponding to the case of the normal CP. In the frequency domain, a system bandwidth is defined to be integer (N) times a Resource Block (RB), a downlink system bandwidth is indicated by a parameter $N_{DL}$, and an uplink system bandwidth is indicated by a parameter $N_{UL}$. A resource block is a resource allocation unit, and may correspond to a plurality of symbols (e.g., 7 symbols when the normal CP is used) of a single slot in the time domain and a plurality of consecutive sub-carriers (e.g., 12 sub-carriers) in the frequency domain. Each element in the resource grid is referred to as a Resource Element (RE). A single RB has 12×7 REs when the normal CP is used, and has 12×6 REs when the extended CP is used.

The resource grid of FIG. 4 may be applied equally to an uplink slot (wherein each symbol may be a SC-FDMA symbol) and a downlink slot (wherein each symbol may be an OFDM symbol). Also, the resource grid of FIG. 4 may be equally applied to a slot of the radio frame structure type 1 shown in FIG. 2 and to a slot of the radio frame structure type 2 shown in FIG. 3.

Figure 5:
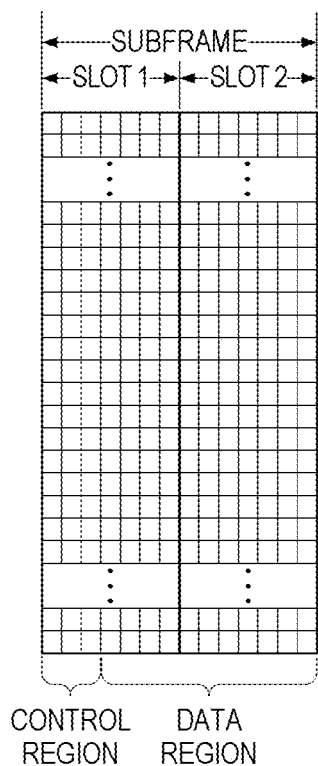
FIG. 5 illustrates the structure of a downlink subframe.

FIG. 5 illustrates the structure of a downlink subframe. Several OFDM symbols (e.g., 3 OFDM symbols) disposed in the front part of a first slot in a single subframe may correspond to a control region to which a control channel is allocated. The remaining OFDM symbols correspond to a data region to which a Physical Downlink Shared Channel (PDSCH) is allocated.

Downlink control channels used in the 3GPP LTE system may include a Physical Control Format Indicator Channel (PCFICH), a Physical Downlink Control Channel (PDCCH), a Physical Hybrid automatic repeat request Indicator Channel (PHICH), and the like. In addition, an Enhanced Physical Downlink Control Channel (EPDCCH) may be transmitted to UEs by an eNB in the data region.

The PCFICH is transmitted in a first OFDM symbol of a subframe, and may include information associated with the number of OFDM symbols used in a control channel transmission in the subframe.

The PHICH is a response to an uplink transmission, and includes Hybrid Automatic Repeat Request Acknowledgement (HARQ-ACK) information.

Control information transmitted through the (E)PDCCH is referred to as Downlink Control Information (DCI). The DCI includes uplink or downlink scheduling information, or may include other control information based on various purposes, such as a command for controlling an uplink transmission power with respect to a UE group, or the like. The eNB determines an (E)PDCCH format based on a DCI transmitted to a UE, and assigns a Cyclic Redundancy Check (CRC) to control information. The CRC is masked with a Radio Network Temporary Identifier (RNTI), based on an owner or the purpose of the (E)PDCCH.

When the (E)PDCCH is for a predetermined UE, the CRC may be masked with a cell-RNTI (C-RNTI) of the UE. Alternatively, when the PDCCH is for a paging message, the CRC may be masked with a Paging Indicator Identifier (P-RNTI). When the PDCCH is for a System Information Block (SIB), the CRC may be masked with a system information identifier and a system information RNTI (SI-RNTI). To indicate a random access response with respect to a random access preamble transmission of a UE, the CRC may be masked with a random access-RNTI (RA-RNTI).

Figure 6:
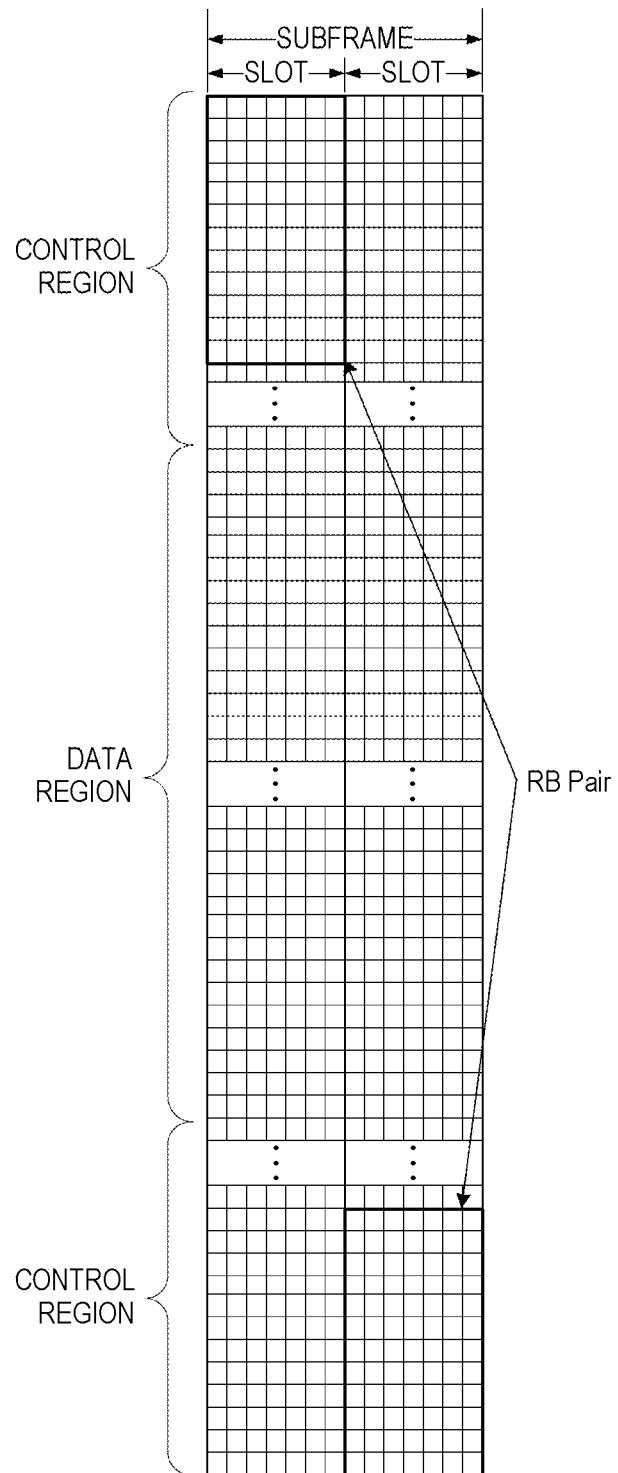
FIG. 6 illustrates the structure of an uplink subframe.

FIG. 6 illustrates the structure of an uplink subframe. An uplink subframe may be separated into a control region and a data region in the frequency domain. A Physical Uplink Control Channel (PUCCH) including uplink control information may be allocated to the control region. A Physical Uplink Shared Channel (PUSCH) including user data may be allocated to the data region. A PUCCH for each UE may be allocated to a Resource Block pair (RB pair) in a subframe. The resource blocks included in the RB pair may occupy different sub-carriers in two slots. This indicates that the RB pair that is allocated to a PUCCH is frequency-hopped in a slot boundary.

Figure 7A:
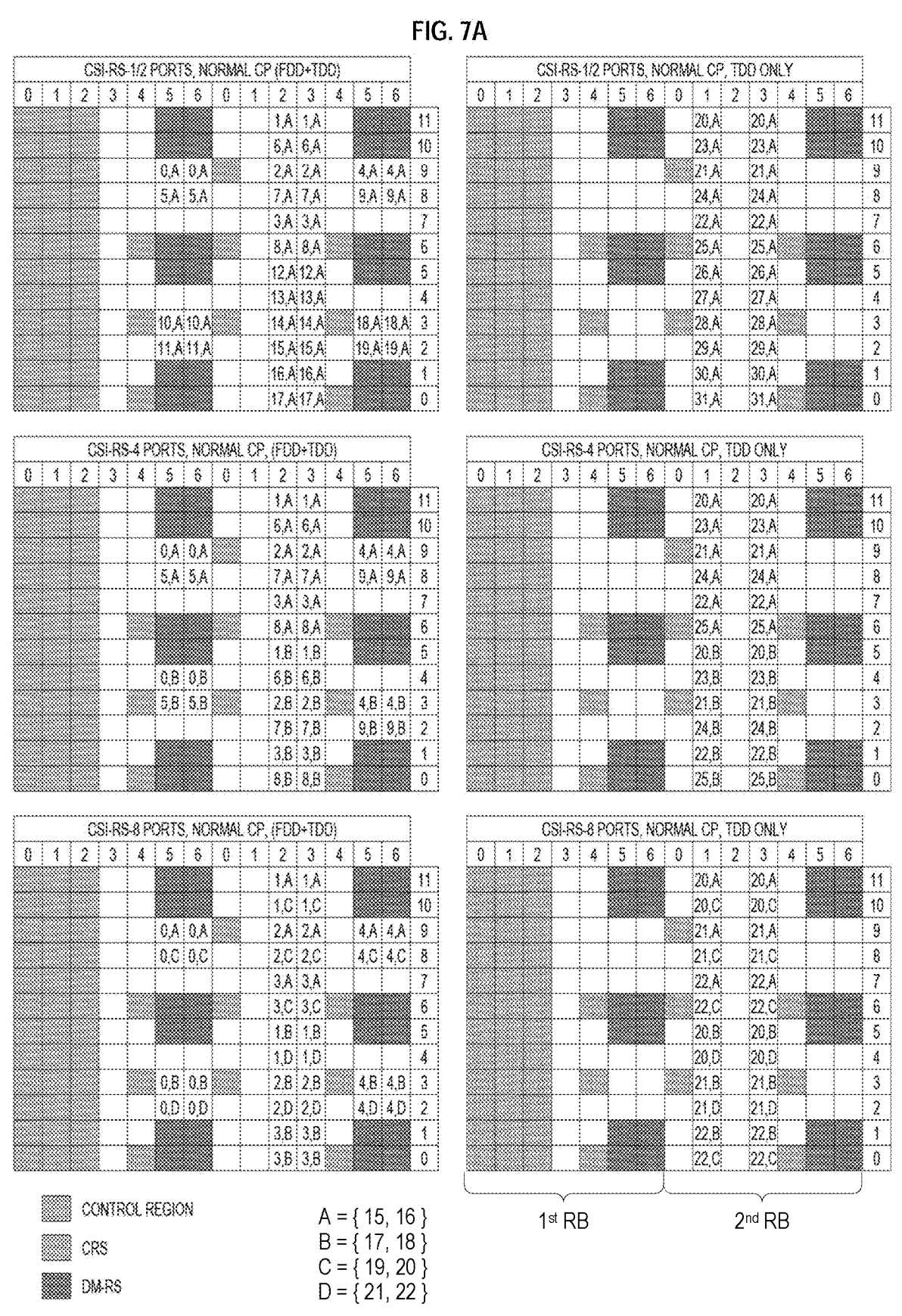

FIGS. 7A and 7B are diagrams illustrating resource mapping of Channel State Information Reference Signals (CSI-RSs) in resource blocks of a down-link subframe. FIG. 7A illustrates CSI-RS resource mapping in an RB pair in the case of a normal CP, and FIG. 7B illustrates CSI-RS resource mapping in an RB pair in the case of an extended CP. In FIGS. 7A and 7B, the locations of a control region, a Cell-specific Reference Signal (CRS) RE, and a Demodulation Reference Signal (DM-RS) RE are illustrated, in addition to the location of REs to which a CSI-RS is mapped.

Although FIGS. 7A and 7B illustrate an RE to which a CRS is mapped when 2 CRS antenna ports are used (that is, antenna port number 0 and antenna port number 1), the present invention may not be limited thereto, and the embodiments of the present invention may be equally applied to when 1 CRS antenna port (that is, antenna port number 0) or 4 CRS antenna ports (that is, antenna port numbers 0, 1, 2, and 3) are used. Also, although 7A and 7B illustrate that the control region uses first three OFDM symbols, the present invention may not be limited thereto, and the embodiments of the present invention may be equally applied when 1, 2, or 4 OFDM symbols are used. Also, although FIGS. 6 and 7 illustrate that a DM-RS uses 2 Code Division Multiplexing (CDM) groups, the present invention may not be limited thereto, and the embodiments of the present invention may be equally applied to when 1 CDM group is used.

A sequence $r_{l,n_s}(m)$ for a CSI-RS may be generated based on:

$$r_{l,n_s}(m) = \frac{1}{\sqrt{2}}(1 - 2\cdot c(2m)) + j\frac{1}{\sqrt{2}}(1 - 2\cdot c(2m+1)), \quad \text{Eqn. 1}$$

$$m = 0 \ldots N_{RB}^{max,DL}$$

wherein $n_s$ denotes a slot number in a radio frame, l denotes an OFDM symbol number in the corresponding slot, c(i) denotes an $i^{th}$ value of a pseudo-random number sequence having a value of 0 or 1, $N_{RB}^{max,DL}$ denotes the maximum number of RBs in the downlink, and j is $\sqrt{-1}$ (the positive square root of −1).

A CSI-RS sequence may be generated by configuring a real part and an imaginary part through a pseudo random sequence, and by performing normalization that multiplies each part and $1/\sqrt{2}$. Here, the pseudo random sequence may be configured using a length-31 Gold sequence. Therefore, since the term 1-2c(i) may have a value of 1 or −1, the real part uses a $2m^{th}$ sequence that corresponds to an even number, and the imaginary part uses a $2m+1^{th}$ sequence that corresponds to an odd number. The pseudo random sequence c(i) may be initialized based on:

$$c_{init}=2^{10}\cdot(7\cdot(n_s+1)+l+1)\cdot(2\cdot N_{ID}^{CSI}+1)+2\cdot N_{ID}^{CSI}+N_{CP} \quad \text{Eqn. 2}$$

wherein $N_{ID}^{CSI}$ may be an integer in the range of 0 to 503, and may correspond to a virtual identifier for a CSI-RS that is signaled from a higher layer, or otherwise may have a value identical to $N_{ID}^{cell}$ that is a physical cell ID (PCI), and wherein $N_{CP}$ is 1 when a normal CP is used, and is 0 when an extended CP is used.

The CSI-RS sequence generated as described above may be mapped to an RE based on the following allocation scheme, and may be transmitted.

A CSI-RS may have a single or a plurality of CSI-RS configurations for each cell. A CSI-RS configuration may include a Non-Zero transmission Power (NZP) CSI-RS configuration that corresponds to the location of an RE through which the CSI-RS is transmitted to a UE of each cell (or of each Remote Radio Head (RRH)), or may include a Zero transmission Power (ZP) CSI-RS configuration for muting a PDSCH region corresponding to a CSI-RS transmission of an adjacent cell (or RRH).

In the NZP CSI-RS configurations, one or more configurations may be signaled to each UE of a corresponding cell. The signaling may be executed through a higher layer (e.g., RRC) signaling. The information signaled to a UE may include 2-bit port count information (e.g., an antennaPorts-Count parameter) indicating whether the number of CSI-RS antenna ports is 1, 2, 4, or 8, and 5-bit resource configuration information (e.g., a resourceConfig parameter) used for determining the location of an RE to which a CSI-RS is mapped. Generally, a CSI-RS configuration may be referred to as a resource configuration.

The 5-bit resource configuration information, which is used for determining the location of an RE to which a CSI-RS is mapped, may indicate a CSI-RS pattern (that is, the locations of CSI-RS REs) that is configured for each value indicating the number of CSI-RSs. FIG. 8A includes a Table 1 showing how the CSI-RS pattern may be configured for 1 or 2, 4, or 8 CSI-RSs when a normal CP is used. FIG. 8B includes a Table 2 showing how the CSI-RS pattern may be configured for 1 or 2, 4, or 8 CSI-RSs when an extended CP is used.

In Table 1, thirty-two CSI-RS patterns are defined when the number of antenna ports is 1 or 2. Sixteen CSI-RS patterns are defined when the number of antenna ports is 4. Eight CSI-RS patterns are defined when the number of antenna ports is 8. FIG. 7A illustrates CSI-RS patterns based on a CSI-RS configuration number and the number of CSI-RS ports in Table 1.

In Table 2, twenty-eight CSI-RS patterns are defined when the number of antenna ports is 1 or 2. Fourteen CSI-RS patterns are defined when the number of antenna ports is 4. Seven CSI-RS patterns are defined when the number of antenna ports is 8. FIG. 7B illustrates CSI-RS patterns based on a CSI-RS configuration number and the number of CSI-RS ports in Table 2.

In the entries of form (number, letter) of FIGS. 7A and 7B, number is in a range of 0 . . . 31 and indicates a CSI-RS configuration number, and letter indicates a CSI-RS antenna port number. In particular, 'A' indicates that a corresponding RE is used for a CSI-RS transmission through CSI-RS antenna port numbers {15, 16}, 'B' indicates that a corresponding RE is used for a CSI-RS transmission through CSI-RS antenna port numbers {17, 18}, 'C' indicates that a corresponding RE is used for a CSI-RS transmission through CSI-RS antenna port numbers {19, 20}, and 'D' indicates that a corresponding RE is used for a CSI-RS transmission through CSI-RS antenna port numbers {21, 22}. A CSI-RS that is transmitted through 2 antenna ports which use an identical RE location may be multiplexed using an Orthogonal Cover Code (OCC)-based CDM scheme, and may therefore be distinguished from each other.

For example, when the 2-bit port count information indicates four ports, the 5-bit resource configuration information indicates 0, and normal CP is used for the FDD+TDD case, FIG. 7A shows that CSI-RSs are transmitted in the first RB of the RB pair on RE(9,5) and RE(9,6) using port numbers 'A'={15, 16} and on RE(4,5) and RE(4,6) using port numbers 'B'={17, 18}. When the 2-bit port count information indicates eight ports, the 5-bit resource configuration information indicates 1, and normal CP is used for the FDD+TDD case, FIG. 7A shows that CSI-RSs are transmitted in the second RB of the RB pair on: RE(11,2) and RE(11,3) using port numbers 'A'={15, 16}, RE(5,2) and RE(5,3) using port numbers 'B'={17, 18}, RE(10,2) and RE(10,3) using port numbers 'C'={19, 20}, and RE(4,2) and RE(4,3) using port numbers 'D'={21, 22}.

A Zero Power (ZP) CSI-RS configuration may be configured as 16-bit bitmap information when the number of CSI-RS antenna ports is 4. For example, when the number of CSI-RS antenna ports is 4 in Table 1 or 2, each of the CSI-RS configurations may correspond to one bit of a 16-bit bitmap. Each bit value (that is, 0 or 1) of the bitmap may be signaled in a corresponding RE by distinguishing the case in which a ZP CSI-RS is transmitted by muting a PDSCH corresponding to a CSI-RS transmission of an adjacent cell or transmission/reception point, and the case in which a ZP CSI-RS is transmitted without muting the PDSCH.

Based on (k', l') determined based on the number of antenna ports and a CSI-RS configuration number, and the value of $n_s$ mod 2 (0 or 1) (i.e., whether a slot index is even or odd), an RE to which a CSI-RS is mapped may be determined by:

$$a_{k,l}^{(p)} = w_l'' \cdot r_{l,n_s}(m'), \quad \text{Eqn. 3}$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{for CSI-RS configurations 0-19, normal cyclic prefix} \\ 2l'' & \text{for CSI-RS configurations 20-21, normal cyclic prefix} \\ l'' & \text{for CSI-RS configurations 0-27, extended cyclic prefix} \end{cases}$$

$$w_l'' = \begin{cases} 1 & \text{for } p \in \{15, 17, 19, 21\} \\ (-1)^{l''} & \text{for } p \in \{16, 18, 20, 22\} \end{cases}, \quad l = 0, 1.$$

$$m = 0, 1, \ldots, N_{RB}^{max,DL} - 1,$$

$$m' = m + \left\lfloor \frac{N_{RB}^{max,DL} - N_{RB}^{DL}}{2} \right\rfloor,$$

In Equation 3, $a_{k,l}^{(p)}$ denotes a complex-valued symbol that is mapped to an antenna port index p, a subcarrier index k, and an OFDM symbol index l, and may be defined in the form of a product of a CSI-RS sequence. $r_{l,n_s}$(m') (such as generated using Equation 1, above) and an OCC $w_t''$.

However, FIGS. 7A-8B do not disclose how to handle the case when the number of antenna ports is greater than eight.

When the number of antenna ports is 12 or 16, a list of one or more NZP-ResourceConfig-r13 informations (referred to hereinafter as ResourceConfig-r13 informations) may be provided to furnish $N_{res}^{CSI}$ CSI-RS configurations in the same subframe, where $N_{res}^{CSI}$>1. The CSI-RS configurations are numbered from 0 to $N_{res}^{CSI}$−1, where 0 corresponds to the CSI-RS configuration indicated by a resourceConfig-r11 or resourceConfig-r10 information provided to the UE, and 1 ... $N_{res}^{CSI}$−1 indicates CSI-RS configuration indicated by successive ResourceConfig-r13 informations provided to the UE.

When the total number of antenna ports P is 12 or 16, the total number of antenna ports P may be determined according to $N_{res}^{CSI}$. In particular, when $N_{res}^{CSI}$=3, each CSI-RS configuration applies to four ports, and the total number of antenna ports P is 12, and the first, second, and third CSI-RS configurations respectively indicate CSI-RS to be communicated using ports {15,16,17,18}, ports {19,20,21,22}, and ports{23,24,25,26}. When $N_{res}^{CSI}$=2, each CSI-RS configuration applies to eight ports, and the total number of antenna ports P is 16, and the first and second CSI-RS configurations respectively indicate CSI-RS to be communicated using ports {15,16,19,20}, ports {17,18,21,22}, ports {23,24,27,28}, and ports {25,26,29,30}.

Embodiments relate to determining a total number of antenna ports P when the total number of antenna ports P is greater than 16.

In an embodiment, when a total number of antenna ports P is greater than 16, a list nzp-resourceConfigList-r13 of one or two of ResourceConfig-r13 informations is followed by a nzp-resourceConfigListExt-r14 of one or more additional ResourceConfig-r13 informations, which lists are aggregated together to form an aggregated list of ResourceConfig-r13 informations. The number $N_{res}^{CSI}$ of CSI-RS configurations in a same subframe is equal to 1 plus the number of CSI-RS configurations indicated in aggregated list of the ResourceConfig-r13 informations.

The CSI-RS configurations are numbered from 0 to $N_{res}^{CSI}$−1, where 0 corresponds to the CSI-RS configuration indicated by a resourceConfig-r11 or resourceConfig-r10 information provided to the UE, and 1 ... $N_{res}^{CSI}$−1 indicates CSI-RS configuration indicated by successive ResourceConfig-r13 informations in the aggregated list of the ResourceConfig-r13 informations. Each CSI-RS configuration applies to $N_{ports}^{CSI}$ antenna ports, where $N_{ports}^{CSI}$ is one of 4 or 8. In embodiments, the number of ports per CSI-RS configuration $N_{ports}^{CSI}$ is communicated using the 2-bit port count information referenced above, which may be communicated in the antennaPortsCount-r11 parameter.

FIG. 9 is a Table 3 showing supported configurations for $N_{ports}^{CSI}$ and $N_{res}^{CSI}$, and shows how a total number of antenna ports P may be determined from the number of $N_{res}^{CSI}$ CSI-RS configurations. A total number of antenna ports P is equal to $N_{ports}^{CSI} \times N_{res}^{CSI}$.

The CSI reference signals are transmitted on 1, 2, 4, 8, 12, 16, 20, 24, 28, 32, 40, 48, or 56 antenna ports using ports {15}, {15,16}, {15, ... ,18}, {15, ... ,22}, {15, ... ,26}, {15, ... ,30}, {15, ... ,34}, {15, ... ,38}, {15, ... ,42}, {15, ... ,46}, {15, ... ,54}, {15, ... ,62}, and {15, ... ,70}, respectively. Each CSI-RS configuration corresponds to one of the configurations in the range 0-19 in Table 1 for communications performed using a normal cyclic prefix, and corresponds to one of the configurations in the range 0-15 in Table 2 for communications performed using an extended cyclic prefix.

If a higher layer parameter NZP-TransmissionComb is not configured, $N_{res}^{CSI}$ unique CSI-RS configurations (from Table 1 for normal cyclic prefix and from Table 2 for extended cyclic prefix) are aggregated to support 12, 16, 20, 24, 28, or 32 antenna ports.

For CSI reference signals using more than sixteen antenna ports, when higher layer parameter NZP-TransmissionComb is configured, the number of unique CSI-RS configurations from Table 1 for normal cyclic prefix and from Table 2 for extended cyclic prefix that are aggregated to form 20, 24, 28, or 32 antenna ports can be less than or equal to $N_{res}^{CSI}$. The number of antenna ports within each such unique CSI-RS configuration is an integer multiple of $N_{ports}^{CSI}$. CSI reference signals may be defined for a subcarrier spacing $\Delta f$=15 Khz only.

FIG. 10 shows CSI-RS-ConfigNZP (CSI-RS-ConfigNZP-r11) information elements (in Abstract Syntax Notation One (ASN.1) as defined by International Telecommunication Union (ITU) Recommendation ITU-T X.680) that indicate CSI-RS configuration using non-zero power transmission that an E-UTRAN may configure on a serving frequency. As shown in Table 3, 40, 48, and 56 antenna ports can be supported as the total number of antenna ports without changing the IE CSI-RS-ConfigNZP information elements (for example, the NZP-ResourceConfig-r13 elements). The IE CSI-RS-ConfigNZP is the CSI-RS configuration using non-zero power transmission that E-UTRAN may configure on a serving frequency.

FIG. 11 includes a Table 4 of descriptions of fields of the CSI-RS-ConfigNZP of FIG. 10. In Table 4, "TS 36.211" refers to the 3rd Generation Partnership Project (3GPP) Technical Specification Group Radio Access Network; Evolved Universal Terrestrial Radio Access (E-UTRA); Physical channels and modulation specification, and "TS 36.213" refers to the 3GPP Technical Specification Group Radio Access Network; Evolved Universal Terrestrial Radio Access (E-UTRA); Physical layer procedures specification.

In another embodiment, when a total number of antenna ports P is greater than 16, a list nzp-resourceConfigList-r13 of one or two ResourceConfig-r13 informations is followed by a nzp-resourceConfigListExt-r14 of one or more additional ResourceConfig-r13 informations. The number $N_{res}^{CSI}$ of CSI-RS configurations in a same subframe is equal to 1 plus the number of CSI-RS configurations indicated in the list nzp-resourceConfigList-r13 of one or two ResourceConfig-r13 informations plus the number of CSI-RS configurations indicated in the nzp-resourceConfigListExt-r14.

The CSI-RS configurations are numbered from 0 to $N_{res}^{CSI}$−1, where 0 corresponds to the CSI-RS configuration indicated by a resourceConfig-r11 or resourceConfig-r10 information provided to the UE, 1 and 2 indicate the CSI-RS configuration indicated in the list of one or two ResourceConfig-r13 informations, and 3 ... $N_{res}^{CSI}$−1 indicate CSI-RS configurations indicated in the nzp-resourceConfigListExt-r14 information. Each CSI-RS configuration applies to $N_{ports}^{CSI}$ antenna ports, where $N_{ports}^{CSI}$ is one of 4 or 8. In embodiments, the number of ports per CSI-RS configuration $N_{ports}^{CSI}$ is communicated using the 2-bit port count information referenced above, which may be communicated in an antennaPortsCount-r11 parameter.

In one embodiment, nzp-resourceConfigList-r13 can be used first and nzp-resourceConfigListExt-r14 needs to be used later. For example, in a case of using 4 CSI-RS resources, the first CSI-RS resource is signaled by CSI-RS-ConfigNZP-r11, the second and third CSI-RS resources are signaled by nzp-resourceConfigList-r13, and the fourth CSI-RS resource is signaled by nzp-resourceConfigListExt-r14.

As in the previous embodiment, the table of FIG. 9 shows the supported configurations for $N_{ports}^{CSI}$ and $N_{res}^{CSI}$, and shows how a total number of antenna ports P may be determined from the number of $N_{res}^{CSI}$ CSI-RS configurations. A total number of antenna ports P is equal to $N_{ports}^{CSI} \times N_{res}^{CSI}$.

The CSI reference signals are transmitted on 1, 2, 4, 8, 12, 16, 20, 24, 28, 32, 40, 48, or 56 antenna ports using ports {15}, {15,16}, {15, . . . ,18}, {15, . . . ,22}, {15, . . . ,26}, {15, . . . ,30}, {15, . . . ,34}, {15, . . . ,38}, {15, . . . ,42}, {15, . . . ,46}, {15, . . . ,54}, {15, . . . ,62}, and {15, . . . ,70}, respectively. Each CSI-RS configuration corresponds to one of the configurations in the range 0-19 in Table 1 for communications using normal cyclic prefixes, and one of the configurations in the range 0-15 in Table 2 for communications using extended cyclic prefixes.

If a higher layer parameter NZP-TransmissionComb is not configured, $N_{res}^{CSI}$ unique CSI-RS configurations (from Table 1 for communications using normal cyclic prefixes or from Table 2 for communications using extended cyclic prefixes) are aggregated to support 12, 16, 20, 24, 28, or 32 antenna ports.

For CSI reference signals using more than sixteen antenna ports, when higher layer parameter NZP-TransmissionComb is configured, the number of unique CSI-RS configurations from Table 1 for normal cyclic prefix and from Table 2 for extended cyclic prefix that are aggregated to form 20, 24, 28, or 32 antenna ports can be less than or equal to $N_{res}^{CSI}$. The number of antenna ports within each such unique CSI-RS configuration is an integer multiple of $N_{ports}^{CSI}$. CSI reference signals may be defined for a subcarrier spacing $\Delta f=15$ Khz only.

In another embodiment, when a total number of antenna ports P is greater than 8, $N_{res}^{CSI}>1$ CSI-RS configurations in the same subframe, numbered from 0 to $N_{res}^{CSI}-1$, where value 0 corresponds to the configured k-th entry of an aggregated list of nzp-resourceConfigList-r13 and nzp-resourceConfigListExt-r14, are aggregated to obtain $N_{ports}^{CSI} \times N_{res}^{CSI}$ antenna ports in total. Each CSI-RS configuration in such an aggregation corresponds to $N_{ports}^{CSI}$, which is one of 4 or 8 antenna ports. In embodiments, the number of ports per CSI-RS configuration $N_{ports}^{CSI}$ is communicated using the 2-bit port count information referenced above, which may be communicated in an antennaPortsCount-r11 parameter. In the aggregated list, a nzp-resourceConfigList-r13 of one or two of ResourceConfig-r13 informations is followed by a nzp-resourceConfigListExt-r14 of one or more additional ResourceConfig-r13 informations when the nzp-resourceConfigListExt-r13 is configured.

The CSI-RS configurations are numbered from 0 to $N_{res}^{CSI}-1$, where 0 corresponds to the CSI-RS configuration indicated by a resourceConfig-r11 or resourceConfig-r10 information provided to the UE, and 1 . . . $N_{res}^{CSI}-1$ indicates CSI-RS configuration indicated by successive ResourceConfig-r13 informations in the aggregated list of nzp-resourceConfigList-r13 and nzp-resourceConfigListExt-r14. Each CSI-RS configuration applies to $N_{ports}^{CSI}$ antenna ports, where $N_{ports}^{CSI}$ is one of 4 or 8. In embodiments, the number of ports per CSI-RS configuration $N_{ports}^{CSI}$ is communicated using the 2-bit port count information referenced above, which may be communicated in the antennaPortsCount-r11 parameter.

In another embodiment, when a total number of antenna ports P is greater than 16, a nzp-resourceConfigList-r13 of one or two ResourceConfig-r13 informations is followed by a nzp-resourceConfigListExt-r14 information of one or more additional ResourceConfig-r13 informations and one or more nzp-resourceConfigListExt-rX (where X is one or more release numbers defining the nzp-resourceConfigListExt and is greater than 14) each indicating additional ResourceConfig-r13 informations. The number $N_{res}^{CSI}$ of CSI-RS configurations in a same subframe is equal to 1 plus the number of CSI-RS configurations indicated in the list of one or two ResourceConfig-r13 informations plus the number of CSI-RS configurations indicated in the nzp-resourceConfigListExt-r14 plus the total number of CSI-RS configurations indicated in the one or more nzp-resourceConfigListExt-rX. Conceptually, nzp-resourceConfigListExt-r14 may be considered one of nzp-resourceConfigListExt-rX, for X=15.

In another embodiment, when a total number of antenna ports P is greater than 8, an aggregated list, in which a nzp-resourceConfigList-r13 of one or two ResourceConfig-r13 informations is followed by a nzp-resourceConfigListExt-r14 (if configured) of one or more additional ResourceConfig-r13 informations and one or more nzp-resourceConfigListExt-rX (if configured, for example X is one or more release numbers defining the nzp-resourceConfigListExt and is greater than 14) each indicating additional ResourceConfig-r13 informations, is formed. The number $N_{res}^{CSI}$ of CSI-RS configurations in a same subframe is equal to 1 plus the number of CSI-RS configurations indicated in the aggregated list of one or two ResourceConfig-r13 informations indicated in nzp-resourceConfigList-r13 plus the number of CSI-RS configurations indicated in the nzp-resourceConfigListExt-r14(if configured) plus the total number of CSI-RS configurations indicated in the one or more nzp-resourceConfigListExt-rX (if configured). Conceptually, nzp-resourceConfigListExt-r14 may be considered one of nzp-resourceConfigListExt-rX, for X=15.

The CSI-RS configurations are numbered from 0 to $N_{res}^{CSI}-1$, where 0 corresponds to the CSI-RS configuration indicated by a resourceConfig-r11 or resourceConfig-r10 information provided to the UE, and 1 . . . $N_{res}^{CSI}-1$ indicate the CSI-RS configuration indicated in the aggregated list of CSI-RS configurations indicated by nzp-resourceConfigList-r13, the nzp-resourceConfigListExt-r14 (if configured), and the nzp-resourceConfigListExt-rX (if configured). Each CSI-RS configuration applies to $N_{ports}^{CSI}$ antenna ports, where $N_{ports}^{CSI}$ is one of 4 or 8. In embodiments, the number of ports per CSI-RS configuration $N_{ports}^{CSI}$ is communicated using the 2-bit port count information referenced above, which may be communicated in an antennaPortsCount-r11 parameter.

Table 5 of FIG. 12 shows the supported configurations for $N_{ports}^{CSI}$ and $N_{res}^{CSI}$, and shows how a total number of antenna ports P may be determined from the number of $N_{res}^{CSI}$ CSI-RS configurations. A total number of antenna ports P is equal to $N_{ports}^{CSI} \times N_{res}^{CSI}$.

The CSI reference signals are transmitted on 1, 2, 4, 8, 12, 16, 20, 24, 28, 32, 36, 40, 44, 48, 52, or 56 antenna ports using ports {15}, {15,16}, {15, . . . ,18}, {15, . . . ,22}, {15, . . . ,26}, {15, . . . ,30}, {15, . . . ,34}, {15, . . . ,38}, {15, . . . ,42}, {15, . . . ,46}, {15, . . . ,50}, {15, . . . ,54}, {15, . . . ,58}, {15, . . . ,62}, {15, . . . ,66}, and {15, . . . ,70}, respectively. Each CSI-RS configuration corresponds to one of the configurations in the range 0-19 in Table 1 for normal cyclic prefix, and one of the configurations in the range 0-15 in Table 2 for extended cyclic prefix.

If the higher layer parameter NZP-TransmissionComb is not configured, $N_{res}^{CSI}$ unique CSI-RS configurations (from Table 1 for normal cyclic prefixes or from Table 2 for extended cyclic prefixes) are aggregated to support 12, 16, 20, 24, 28, or 32 antenna ports.

For CSI reference signals using more than sixteen antenna ports, when higher layer parameter NZP-TransmissionComb is configured, the number of unique CSI-RS configurations from Table 1 for normal cyclic prefix and from Table 2 for extended cyclic prefix that are aggregated to form 20, 24, 28, or 32 antenna ports can be less than or equal to $N_{res}^{CSI}$. The number of antenna ports within each such unique CSI-RS configuration is an integer multiple of $N_{ports}^{CSI}$. CSI reference signals may be defined for a subcarrier spacing $\Delta f=15$ Khz only.

FIG. 13 shows CSI-RS-ConfigNZP ((CSI-RS-ConfigNZP-r11) information elements (in ASN.1) that indicate CSI-RS configuration using non-zero power transmission that E-UTRAN may configure on a serving frequency. As shown in Table 5, 36, 40, 44, 48, 52, and 56 antenna ports can be supported as the total number of antenna ports without changing the IE CSI-RS-ConfigNZP information elements (for example, the NZP-ResourceConfig-r13 elements) by additionally defining a parameter CSI-RS-ConfigNZP-EMIMO-rX (X is the release number defining the additional parameter). The IE CSI-RS-ConfigNZP is the CSI-RS configuration using non-zero power transmission that E-UTRAN may configure on a serving frequency.

FIG. 14 illustrates a process 1400 for transmitting an indication of a (total) number of antenna ports P according to Table 3 of FIG. 9. The process 1400 may be performed by a Node B (or eNodeB) of a wireless communication network, such as an LTE network. The process 1400 does not transmit an explicit indication of the total number of antenna ports P when the total number of antenna ports P is greater than 8.

At S1402 the process 1400 determines a total number of antenna ports P and a sequence of CSI-RS configurations for that number of antenna ports. The number of CSI-RS configurations is dependent on the number of antenna ports P, as shown in Table 3

At S1404 the process 1400 sets a resourceConfig-r11 parameter to a value indicative of the first CSI-RS configuration of the CSI-RS configurations.

At S1406, when the number of antenna ports P is 1, 2, 4, or 8, the process 1400 proceeds to S1408; otherwise, the process 1400 proceeds to S1410.

At S1408, the process 1400 sets an antennaPortsCount-r11 parameter to a value indicative of the number of antenna ports P. In this case, the antennaPortsCount-r11 parameter indicates the total number of antenna ports. The antennaPortsCount-r11 parameter may be a two bit value having one of a first through fourth values indicating 1, 2, 4, or 8 antenna ports, respectively. The process 1400 then proceeds to S1432.

At S1410, the process 1400 sets the first element of a nzp-resourceConfigList-r13 parameter to a value indicative of the second CSI-RS configuration of the CSI-RS configurations.

At S1412, when the number of antenna ports P is 16, the process 1400 proceeds to S1414; otherwise the process 1400 proceeds to S1416.

At S1414, the process 1400 sets the antennaPortsCount-r11 parameter to a value indicating 8 antenna ports. In this case, the antennaPortsCount-r11 parameter indicates the number of antenna ports per CSI-RS configuration (and here, there are two CSI-RS configurations). The process 1400 then proceeds to S1434.

At S1416, the process 1400 sets the second element of a nzp-resourceConfigList-r13 parameter to a value indicative of the third CSI-RS configuration of the CSI-RS configurations.

At S1418, when the number of antenna ports P is 12, the process 1400 proceeds to S1420; otherwise the process 1400 proceeds to S1422.

At S1420, the process 1400 sets the antennaPortsCount-r11 parameter to a value indicating 4 antenna ports. In this case, the antennaPortsCount-r11 parameter indicates the number of antenna ports per CSI-RS configuration (and here, there are three CSI-RS configurations). The process 1400 then proceeds to S1434.

At S1422, when the number of antenna ports P is 20 or 28, the process 1400 proceeds to S1424; otherwise the process 1400 proceeds to S1428. This is because in the embodiment of FIG. 9, as shown in Table 3, when the number of antenna ports P is 20 or 28, each CSI-RS configuration corresponds to 4 antenna ports, while when the number of antenna ports P is 24, 32, 40, 48, or 56, each CSI-RS configuration corresponds to 8 antenna ports.

At S1424, the process 1400 sets the antennaPortsCount-r11 parameter to a value indicating 4 antenna ports. In this case, the antennaPortsCount-r11 parameter indicates the number of antenna ports per CSI-RS configuration (and here, there are either 5 or 7 total CSI-RS configurations).

At S1426, the process 1400 sets the elements of an nzp-resourceConfigListExt-r14 parameter to values indicative of the remaining CSI-RS configuration(s) of the CSI-RS configurations. For example, if the number of antenna ports is 20 or 28, the first and second elements of the nzp-resourceConfigListExt-r14 are set to respectively indicate the fourth and fifth CSI-RS configurations of the CSI-RS configuration, and if the number of antenna ports is 28, the third and fourth elements of the nzp-resourceConfigListExt-r14 are set to respectively indicate the sixth and seventh CSI-RS configurations of the CSI-RS configuration. The process 1400 then proceeds to S1436.

At S1428, the process 1400 sets the antennaPortsCount-r11 parameter to a value indicating 8 antenna ports. In this case, the antennaPortsCount-r11 parameter indicates the number of antenna ports per CSI-RS configuration (and here, there are between 3 and 7 CSI-RS configurations).

At S1430, the process 1400 sets the elements of an nzp-resourceConfigListExt-r14 parameter to values indicative of the remaining CSI-RS configuration(s) of the CSI-RS configurations. When the number of antenna ports P is 24, there are no remaining CSI-RS configurations (as the first to third CSI-RS configurations are already indicated by the resourceConfig-r11 parameter and the nzp-resourceConfigList-r13 parameter) and so the nzp-resourceConfigListExt-r14 parameter has zero elements.

When the number of antenna ports P is greater than 24, there are one or more elements in the nzp-resourceConfigListExt-r14 parameter, the $n^{th}$ element of which is set to a value indicative of the $(n-3)^{th}$ CSI-RS parameter of the CSI-RS configurations, for n=1 . . . (P/8−3). The process 1400 then proceeds to S1436.

At S1432, the process 1400 transmits the resourceConfig-r11 and antennaPortsCount-r11 parameters to one or more receiving devices. The process 1400 then exits.

At S1434, the process 1400 transmits the resourceConfig-r11, the antennaPortsCount-r11 parameter, and the nzpresourceConfigList-r13 parameters to one or more receiving devices. In embodiments, the process 1400 may also transmit one or more of a transmissionComb-r14 parameter and a frequencyDensity-r14 parameter. The process 1400 then exits.

At S1436, the process 1400 transmits the resourceConfig-r11, the antennaPortsCount-r11 parameter, the nzp-resourceConfigList-r13, and the nzp-resourceConfigListExt-r14 parameters to one or more receiving devices. In embodiments, the process 1400 may also transmit one or more of a transmissionComb-r14 parameter and a frequencyDensity-r14 parameter. The process 1400 then exits.

In the manner described above with reference to FIG. 14, when a total number of antenna ports P is greater than 8, the process 1400 communicates an indication of the total number of antenna ports P without an explicit indication thereof by transmitting a plurality of indications of CSI-RS configurations and an indication of a number of antenna ports per CSI-RS configuration.

The Node B generates a reference sequence for each CSI-RS configuration. The reference sequence may include a pseudo random sequence being initialized with an initialization value. The initialization value may be determined based on an identifier for the CSI-RS configuration.

The pseudo random sequence may be defined by Equation 1, above. The pseudo random sequence c(i) may be initialized using Equation 2, above.

The Node-B maps the reference sequence on a CSI-RS resources according to CSI-RS configurations. The Node-B transmits, to the UE, the CSI-RS including the mapped reference sequence.

Figure 15:
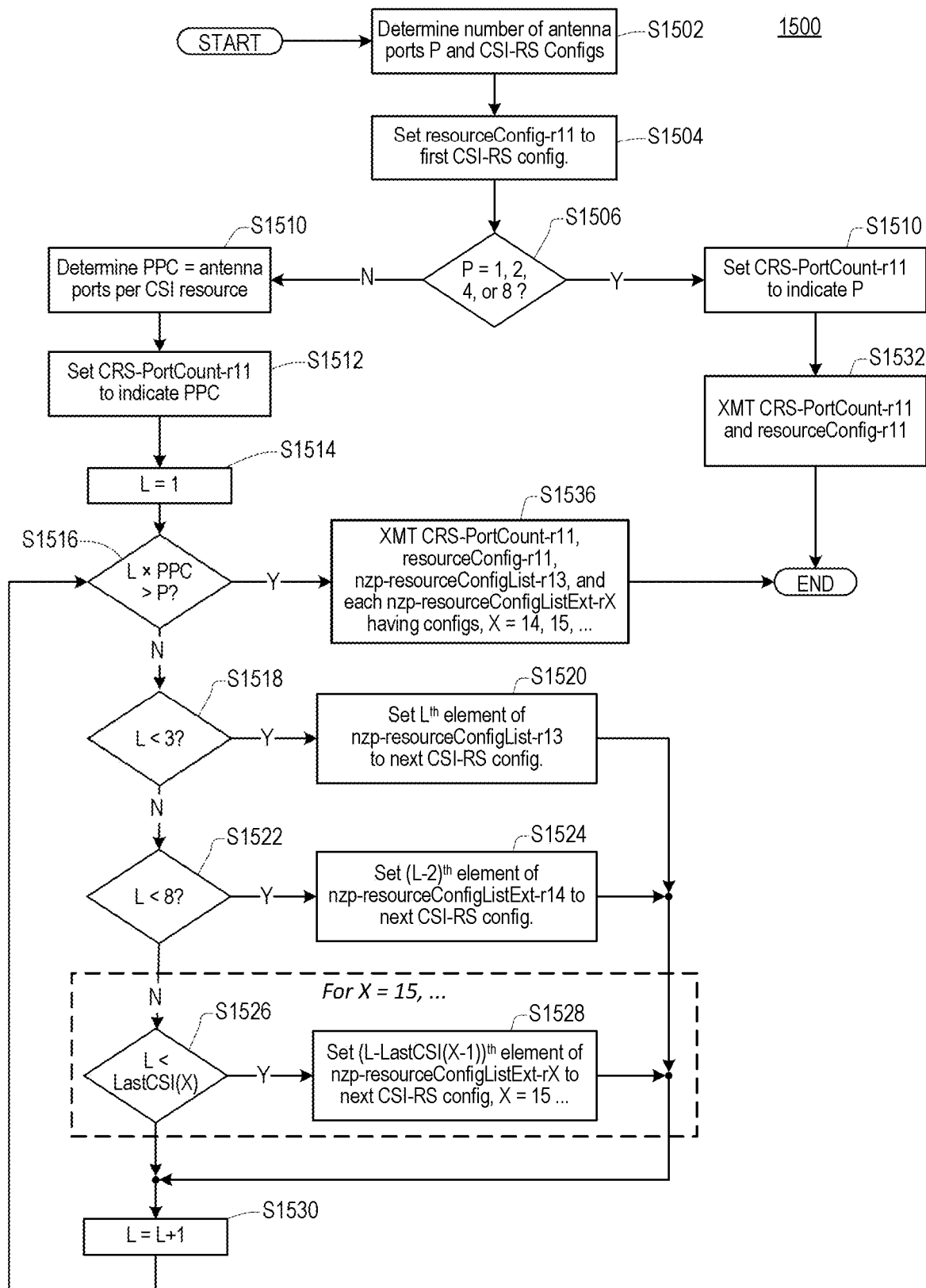
FIG. 15 illustrates a process for communicating a total number of antenna ports according to another embodiment.

FIG. 15 illustrates a process 1500 for transmitting an indication of a number of antenna ports P according to another embodiment. The process 1500 may be performed by a Node B (or eNodeB) of a wireless communication network, such as an LTE network. The process 1500 does not transmit an explicit indication of the total number of antenna ports P when the total number of antenna ports P is greater than 8.

At S1502 the process 1500 determines a number of antenna ports P and a sequence of CSI-RS configurations for that number of antenna ports P, as described with respect to S1402 of FIG. 14. In an embodiment, the number of CSI-RS configurations may be determined from the number of antenna ports P according to Table 5 of FIG. 12. In another embodiment, the number of CSI-RS configurations may be determined from the number of antenna ports P according to Table 3 of FIG. 9.

At S1504 the process 1500 sets a resourceConfig-r11 parameter to a value indicative of the first CSI-RS configuration of the CSI-RS configurations.

At S1506, when the number of antenna ports P is 1, 2, 4, or 8, the process 1500 proceeds to S1508; otherwise, the process 1500 proceeds to S1510.

At S1508, the process 1500 sets an antennaPortsCount-r11 parameter to a value indicative of the number of antenna ports P. In this case, the antennaPortsCount-r11 parameter indicates the total number of antenna ports. The antennaPortsCount-r11 parameter may be a two bit value having one of a first through fourth values indicating 1, 2, 4, or 8 antenna ports, respectively. The process 1500 then proceeds to S1532.

At S1510, the process 1500 determines a number of antenna ports per CSI-RS configuration (hereinafter Ports Per Configuration PPC). In an embodiment, the Ports Per Configuration PPC may be determined from the number of antenna ports P according to the $N_{por}^{CSI}$ parameter of Table 5. In another embodiment the Ports Per Configuration PPC may be determined from the number of antenna ports P according to the $N_{ports}^{CSI}$ parameter of Table 3.

At S1512, the process 1500 sets the antennaPortsCount-r11 parameter to a value indicative of the Ports Per Configuration PPC.

At S1514, the process 1500 initializes a loop counter L to 1, indicating that one CSI-RS configuration has been processed (in S1504).

At S1516, the process 1500 determines whether all the CSI-RS configurations have been processed; that is, whether the product of the loop counter L (indicating the number of processed CSI-RS configurations) and the Ports Per Configuration PPC is greater than the number of antenna ports P. At S1516, when the process 1500 determines that all the CSI-RS configurations have been processed, the process 1500 proceeds to S1536; otherwise, the process 1500 proceeds to S1518.

At S1518, the process 1500 determines whether the loop counter L is less than 3; that is, whether 2 or less CSI-RS configuration have been processed. When the process 1500 determines that the loop counter L is less than or equal to two (indicating that the next CSI-RS configuration should be communicated in nzp-resourceConfigList-r13), the process 1500 proceeds to S1520; otherwise, the process 1500 proceeds to S1522.

At S1520, the process 1500 sets the first (L=1) or second (L=2) element of a nzp-resourceConfigList-r13 parameter to a value indicative of the current (that is, the $(L+1)^{th}$) CSI-RS configuration being processed of the CSI-RS configurations (i.e., the second CSI-RS configuration when the loop counter L=1, and the third CSI-RS configuration when the loop counter L=2). The process 1500 then proceeds to S1530.

At S1522, the process 1500 determines whether the loop counter L is less than 8; that is, whether between 3 and 7 CSI-RS configuration have been processed. When the process 1500 determines that the loop counter L is less than or equal to seven (indicating that the next CSI-RS configuration should be communicated in nzp-resourceConfigListExt-r14), the process 1500 proceeds to S1524; otherwise, the process 1500 proceeds to S1526.

At S1524, the process 1500 sets the $(L-2)^{th}$ element of a nzp-resourceConfigListExt-r14 parameter to a value indicative of the current (that is, the $(L+1)^{th}$) CSI-RS configuration being processed of the CSI-RS configurations, That is, the first element of the nzp-resourceConfigListExt-r14 parameter is set to a value indicative of the fourth CSI-RS configuration, and so on. The process 1500 then proceeds to S1530.

Steps S1526 and S1528 operate similarly to S1522 and S1524, respectively, but for additional parameters here designated as "nzp-resourceConfigListExt-rX," where X is an integer greater than or equal to 15. Thus S1526 and S1528 stand in for a sequence of step pairs, each step pair corresponding to an integer value of X greater than or equal to 15, and each S1526 falling through to the next S1526 when its test gives a "N" result, until the final S1526 for the largest supported X, which falls through to S1530 or, in an embodiment, into an error-signaling step.

Like nzp-resourceConfigListExt-r14, each nzp-resourceConfigListExt-rX parameter can indicate 0 to some function of X CSI-RS configurations. Each nzp-resourceConfigListExt-rX parameter may, in an embodiment, indicate up to 5 CSI-RS configurations. Conceptually, nzp-resourceConfigListExt-r14 may be considered to be nzp-resourceConfigListExt-rX for X=14.

The last CSI-RS configurations that a nzp-resourceConfigListExt-rX parameter can indicate is represented by the function LastCSI(X). For example, in an embodiment where nzp-resourceConfigListExt-r14 can indicate the fourth through eight CSI-RS configurations and nzp-resourceConfigListExt-r15 can indicate the ninth through thirteenth CSI-RS configurations, LastCSI(14) would be equal to 8, and LastCSI(15) would be equal to 13.

At S1526, the process 1500 determines whether the loop counter L is less than LastCSI(X) for the current X, X>15; When the process 1500 determines that the loop counter L is less than LastCSI(X) (indicating that the next CSI-RS configuration should be communicated in nzp-resourceConfigList-rX), the process 1500 proceeds to S1528 for this X; otherwise, the process 1500 proceeds to S1526 of the next X, or to S1530 or an error-signaling step if no next X exists (that is, if there are more next CSI-RS configurations than can be communicated by the particular embodiment of the process 1500).

At S1528, the process 1500 sets the (L-LastCSI(X-1))$^{th}$ element of a nzp-resourceConfigList-r13 parameter to a value indicative of the current CSI-RS configuration being processed The process 1500 then proceeds to S1530.

At S1530, the process 1500 increments the loop counter L by 1 and then proceeds to S1516.

At S1532, the process 1500 transmits the resourceConfig-R11 and antennaPortsCount-r11 parameters to one or more receiving devices. The process 1500 then exits.

At S1536, the process 1500 transmits the resourceConfig-r11, the antennaPortsCount-r11 parameter, the nzp-resourceConfigList-r13, and if needed the nzp-resourceConfigList-rX parameters (X=14, 15, . . . ) to one or more receiving devices. In embodiments, the process 1500 may also transmit one or more of a transmissionComb-r14 parameter and a frequencyDensity-r14 parameter. The process 1500 then exits.

In the manner described above with reference to FIG. 15, the process 1500 communicates an indication of the total number of antenna ports P without an explicit indication thereof by transmitting a plurality of indications of CSI-RS configurations and an indication of a number of antenna ports per CSI-RS configuration.

The Node B generates a reference sequence for each CSI-RS configuration. The reference sequence may include a pseudo random sequence being initialized with an initialization value. The initialization value may be determined based on an identifier for the CSI-RS configuration. The pseudo random sequence may be defined by Equation 1, above, and initialized as described by Equation 2, above.

Figure 16:
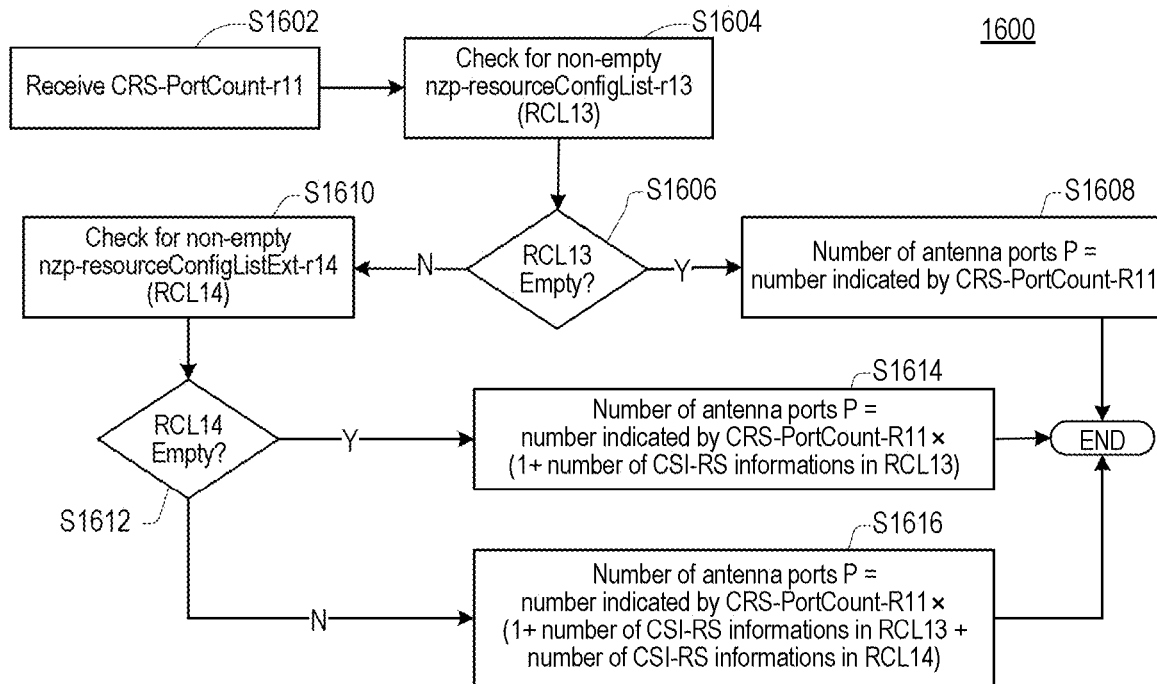
FIG. 16 illustrates a process for determining a total number of antenna ports according to an embodiment.

FIG. 16 illustrates a process 1600 for determining a total number of antenna ports according to an embodiment. The process 1600 may be performed by a UE receiving parameters over a wireless communication channel from a Node B or the like.

At S1602, the process 1600 receives an antennaPortsCount-r11 parameter indicating a number of antenna ports. The an antennaPortsCount-r11 parameter may be capable of having any one of first, second, third, and fourth values respectively indicating 1, 2, 4, or 8 antenna ports. In one embodiment, when a total number of antenna ports P is greater than 8, $N_{res}^{CSt}$>1 CSI-RS configurations in the same subframe, numbered from 0 to $N_{res}^{CSI}$-1, where value 0 corresponds to the configured k-th entry of an aggregated list of nzp-resourceConfigList-r13 and nzp-resourceConfigListExt-r14, are aggregated to obtain $N_{ports}^{CSI} \times N_{res}^{CSI}$ antenna ports in total. Each CSI-RS configuration in such an aggregation corresponds to $N_{ports}^{CSI}$, which is one of 4 or 8 antenna ports. In embodiments, the number of ports per CSI-RS configuration $N_{ports}^{CSI}$ communicated using the 2-bit port count information referenced above, which may be communicated in an antennaPortsCount-r11 parameter. In the aggregated list, a nzp-resourceConfigList-r13 of one or two CSI-RS resource allocations is followed by a nzp-resourceConfigListExt-r14 of one or more additional when the nzp-resourceConfigListExt-r13 is configured.

At S1604, the process 1600 checks whether a nzp-resourceConfigList-r13 parameter RCL13 has been received and includes one or more informations indicates CSI-RS resource allocations (that is, one or more CSI-RS resource allocation information entries). If a nzp-resourceConfigList-r13 parameter RCL13 has not been received or has no information's indicating CSI-RS resource allocations, the nzp-resourceConfigList-r13 parameter RCL13 is considered empty.

At S1606, when the nzp-resourceConfigList-r13 parameter RCL13 is empty, the process 1600 proceeds to S1608; otherwise, the process 1600 proceeds to S1610.

At S1608, the process 1600 determines that a total number of antenna ports P is equal to the number of antenna ports indicated by the antennaPortsCount-r11 parameter.

At S1610, the process 1600 checks whether a nzp-resourceConfigListExt-r14 parameter RCL14 has been received and includes one or more informations indicates CSI-RS resource allocations. If a nzp-resourceConfigListExt-r14 parameter RCL14 has not been received or has no information's indicating CSI-RS resource allocations, the nzp-resourceConfigListExt-r14 parameter RCL14 is considered empty.

At S1612, when the nzp-resourceConfigListExt-r14 parameter RCL14 is empty, the process 1600 proceeds to S1614; otherwise, the process 1600 proceeds to S1616.

At S1614, the process 1600 determines that a total number of antenna ports P is equal to the product of the number of antenna ports indicated by the antennaPortsCount-r11 parameter and the sum of one and the number of CSI-RS resource allocation information entries included in nzp-resourceConfigList-r13 RCL13.

At S1616, the process 1600 determines that a total number of antenna ports P is equal to the product of the number of antenna ports indicated by the antennaPortsCount-r11 parameter and the sum of one, the number of CSI-RS resource allocation information entries included in nzp-resourceConfigList-r13 RCL13, and the number of CSI-RS resource allocation information entries included in nzp-resourceConfigListExt-r14 RCL14.

Using the process 1600, a UE can determine a total number of antenna ports without an explicit signaling of that number by the Node-B. The total number of antenna ports is equal to a product of the number of antenna ports indicated in the antennaPortsCount-r11 parameter and a total number of CSI-RS resource allocation information entries sent by the Node-B.

Figure 17:
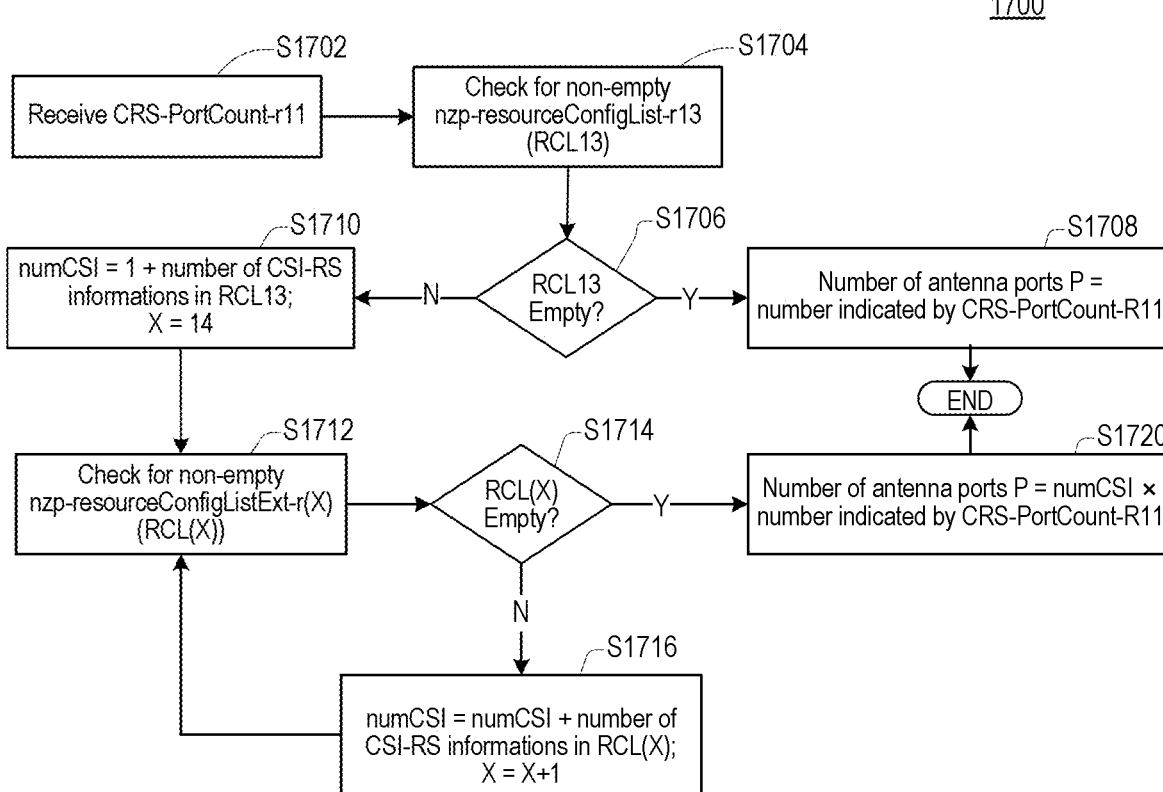
FIG. 17 illustrates a process for determining a total number of antenna ports according to another embodiment.

FIG. 17 illustrates a process 1700 for determining a number of antenna ports according to another embodiment. The process 1700 may be performed by a UE receiving parameters over a wireless communication channel from a Node B or the like.

At S1702, the process 1700 receives an antennaPortsCount-r11 parameter indicating a number of antenna ports. The antennaPortsCount-r11 parameter may be capable of having any one of first, second, third, and fourth values respectively indicating 1, 2, 4, or 8 antenna ports.

At S1704, the process 1700 checks whether a nzp-resourceConfigList-r13 parameter RCL13 has been received and includes one or more informations indicates CSI-RS resource allocations (that is, one or more CSI-RS resource allocation information entries). If a nzp-resourceConfigList-r13 parameter RCL13 has not been received or has no information's indicating CSI-RS resource allocations, the nzp-resourceConfigList-r13 parameter RCL13 is considered empty.

At S1706, when the nzp-resourceConfigList-r13 parameter RCL13 is empty, the process 1700 proceeds to S1708; otherwise, the process 1700 proceeds to S1710.

At S1708, the process 1700 determines that a total number of antenna ports P is equal to the number of antenna ports indicated by the antennaPortsCount-r11 parameter. The process 1700 then ends.

At S1710, the process 1700 sets a number of CSI-RS configurations numCSI to one plus the number of CSI-RS informations (that is, one or more CSI-RS resource allocation information entries) in the nzp-resourceConfigList-r13 parameter RCL13. The process S1710 initializes a loop counter X to 14.

At S1712, the process 1700 checks whether a nzp-resourceConfigListExt-r(X) parameter RCL(X) has been received and includes one or more informations indicates CSI-RS resource allocations (that is, one or more CSI-RS resource allocation information entries). For example, during the first pass through the loop comprising S1712, S1714, and S1716, the loop counter X=14 and a nzp-resourceConfigListExt-r(X) is nzp-resourceConfigListExt-r14.

If the nzp-resourceConfigListExt-r(X) parameter RCL(X) has not been received or has no information's indicating CSI-RS resource allocations (that is, no CSI-RS resource allocation information entries), the nzp-resourceConfigListExt-r(X) parameter RCL(X) is considered empty.

At S1714, when the nzp-resourceConfigList-r(X) parameter RCL(X) is empty, the process 1700 proceeds to S1720; otherwise, the process 1700 proceeds to S1716.

At S1716, the process 1700 increases the number of CSI-RS configurations numCSI by the number of CSI-RS informations (that is, one or more CSI-RS resource allocation information entries) in the nzp-resourceConfigList-r(X) parameter RCL(X), increases the loop counter X by 1, and then proceeds to S1712.

At S1720, the process 1700 determines that a total number of antenna ports P is equal to the number of antenna ports indicated by the antennaPortsCount-r11 parameter times the number of CSI-RS configurations numCSI. The process 1700 then ends.

Using the process 1700, a UE determines a total number of antenna ports without explicit signaling of that number by the Node-B. The total number of antenna ports is equal to a product of the number of antenna ports indicated in the antennaPortsCount-r11 parameter and a sum of one, a number of CSI-RS resource allocation information entries (if any) sent in the by the Node-B in a nzp-resourceConfigList-r13 parameter, and a number of CSI-RS resource allocation information entries (if any) indicated in one or more additional nzp-resourceConfigListExt-rX parameters, for X greater than or equal to 14.

INDUSTRIAL APPLICABILITY

Embodiments permit a Node-B to communicate a total number of antenna ports to a UE with backwards compatibility to pre-release-14 versions of the 3GPP LTE specification when the total number of antenna ports being signaled is greater than 16. Embodiments communicate the total number of antenna ports without explicitly signaling the total number of antenna ports.

Embodiments of the present disclosure include electronic devices configured to perform one or more of the operations described herein. However, embodiments are not limited thereto.

Embodiments of the present disclosure may further include systems configured to operate using the processes described herein. Although the various embodiments of the present invention have been described from the perspective of the 3GPP LTE or LTE-A system such as shown in FIG. 1, embodiments are not limited thereto and may be applied to various mobile communication systems.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate, communicate, and decode the information described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., a base station such as a Node B or evolved Node B; or a User Equipment such as a cellular phone, cellular hotpot, or other device including a cellular modem) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A base station for operation in a wireless network, the base station comprising:
    one or more memories; and
    one or more processors coupled to the one or more memories, the one or more processors configured to cause:
    generating an antenna ports count parameter indicative of a number of antenna ports;
    generating a sequence of Channel State Information Reference Signal (CSI-RS) configuration indications, wherein CSI-RS configuration indications are included in a first resource configuration parameter including a first CSI-RS configuration indication, a first resource configuration list and a second resource configuration list, each list including part of remaining CSI-RS configuration indications, and a total number of antenna ports is equal to a product of a number of CSI-RS configuration indications and the number of antenna ports; and transmitting the antenna ports count parameter, the first resource configuration parameter, the first resource configuration list and the second resource configuration list, wherein when N>1 CSI-RS configurations exist and are numbered from 0 to N−1, value 0 corresponds to the first CSI-RS configuration indication included in the first resource configuration parameter and value k (k>0) corresponds to a k-th entry of CSI-RS configuration indications from an aggregated list consisting of the first resource configuration list and the second resource configuration list.

2. The base station of claim 1, wherein the number of the CSI-RS configuration indications is equal to a sum of one, a first number of CSI-RS configuration indications included in the first resource configuration list, and a second number of CSI-RS configuration indications included in the second resource configuration list.

3. The base station of claim 1, wherein the first resource configuration list is followed by the second resource configuration list in the aggregated list.

4. The base station of claim 1, wherein the number of CSI-RS configuration indications is equal to a sum of one and a number of CSI-RS configuration indications included in the aggregated list consisting of the first resource configuration list and the second resource configuration list.

5. The base station of claim 1, wherein CSI-RS configuration indications are included in the first resource configuration parameter including the first CSI-RS configuration indication and two or more configuration lists including remaining CSI-RS configuration indications, and the aggregated list consists of the two or more resource configuration lists.

6. The base station of claim 5, wherein the number of CSI-RS configuration indications is equal to a sum of one and respective numbers of CSI-RS configuration indications included in the two or more resource configuration lists.

7. The base station of claim 5, wherein the number of CSI-RS configuration indications is equal to a sum of one and a number of CSI-RS configuration indications included in the aggregated list consisting of the two or more resource configuration lists.

8. The base station of claim 1, wherein the total number of antenna ports are greater than a maximum number of antenna ports indicated by the antenna ports count parameter.

9. A user equipment for communicating with a base station in a wireless network, the user equipment comprising:

one or more memories; and one or more processors coupled to the one or more memories, the one or more processors configured to cause:

receiving an antenna ports count parameter indicative of a number of antenna ports;

receiving a sequence of Channel State Information Reference Signal (CSI-RS) configuration indications, wherein the CSI-RS configuration indications are included in a first resource configuration parameter including a first CSI-RS configuration indication, a first resource configuration list and a second resource configuration list, each list including part of remaining CSI-RS configuration indications; and determining a total number of antenna ports, the total number of antenna ports being equal to a product of a number of CSI-RS configuration indications and the number of antenna ports, wherein when N>1 CSI-RS configurations exist and are numbered from 0 to N−1, value 0 corresponds to the first CSI-RS configuration indication included in the first resource configuration parameter and value k (k>0) corresponds to a k-th entry of CSI-RS configuration indications from an aggregated list consisting of the first resource configuration list and the second resource configuration list.

10. The user equipment of claim 9, wherein the number of the CSI-RS configuration indications is equal to a sum of one, a first number of CSI-RS configuration indications included in the first resource configuration list and a second number of CSI-RS configuration indications included in the second resource configuration list.

11. The user equipment of claim 9, wherein the first resource configuration list is followed by the second resource configuration list in the aggregated list.

12. The user equipment of claim 9, wherein the number of CSI-RS configuration indications is equal to a sum of one and a number of CSI-RS configuration indications included in the aggregated list consisting of the first resource configuration list and the second resource configuration list.

13. The user equipment of claim 9, wherein CSI-RS configuration indications are included in the first resource configuration parameter including the first CSI-RS configuration indication and two or more configuration lists including remaining CSI-RS configuration indications, and the aggregated list consists of the two or more resource configuration lists.

14. The user equipment of claim 13, wherein the number of CSI-RS configuration indications is equal to a sum of one and respective numbers of CSI-RS configuration indications included in the two or more resource configuration lists.

15. The user equipment of claim 13, wherein the number of CSI-RS configuration indications is equal to a sum of one and a number of CSI-RS configuration indications included in the aggregated list consisting of the two or more resource configuration lists.

16. The user equipment of claim 9, wherein the total number of antenna ports are greater than a maximum number of antenna ports indicated by the antenna ports count parameter.

* * * * *